United States Patent [19]
Bair et al.

[11] Patent Number: 4,559,698
[45] Date of Patent: * Dec. 24, 1985

[54] METHOD OF TREATING A LOOSE WOUND CORE, METHOD OF FABRICATING A LOOSE WOUND CORE, AND METHOD OF OPERATING APPARATUS

[75] Inventors: Eugene C. Bair; Delmar E. Crawford, both of Holland, Mich.

[73] Assignee: General Electric Company, Fort Wayne, Ind.

[ * ] Notice: The portion of the term of this patent subsequent to Nov. 27, 2001 has been disclaimed.

[21] Appl. No.: 563,766

[22] Filed: Dec. 21, 1983

[51] Int. Cl.⁴ ............................................. H02K 15/12
[52] U.S. Cl. ........................................ 29/598; 29/596; 427/104; 427/116
[58] Field of Search .......................... 29/596, 598, 609; 427/116, 104; 118/56, 320–322; 310/42, 43, 45

[56] References Cited

U.S. PATENT DOCUMENTS

| | | | |
|---|---|---|---|
| 2,572,515 | 10/1951 | Poole et al. | 117/43 |
| 2,574,686 | 11/1951 | Brown | 117/43 |
| 3,283,742 | 11/1966 | Fuchs et al. | 427/116 X |
| 3,456,615 | 7/1969 | Zander et al. | 118/5 |
| 3,513,808 | 5/1970 | Mortimer et al. | 118/9 |
| 3,527,662 | 9/1970 | Elsworth | 117/232 |
| 3,782,325 | 1/1974 | Farnsworth et al. | 118/58 |
| 3,821,846 | 7/1974 | Pleiss, Jr. et al. | 29/596 |
| 4,485,126 | 11/1984 | Gaietto et al. | 427/116 |

Primary Examiner—Carl E. Hall
Attorney, Agent, or Firm—Joseph E. Papin

[57] ABSTRACT

A hardenable liquid adhesive material is dispensed onto opposite end turn portions of coils in winding means of a loose wound core with a greater amount of the liquid adhesive material flowing therefrom generally along one of the opposite side turn portions of the coils into the slots of a generally loose lamination stack of the loose wound core in which the one opposite side turn portion of the coils are received in response to the rotation of the loose wound core in one direction and with a greater amount of the liquid adhesive material flowing generally along the other of the opposite side turn portions of the coils into the slots of the loose lamination stack in which the other opposite side turn portions of the coils are received in response to the rotation of the loose wound core in another direction opposite the one direction thereby to generally equalize the liquid adhesive material fill of the slots. From the slots of the loose lamination stack, the liquid adhesive material flows generally by capillary action into wetting relation between the interfacing laminations of the loose lamination stack generally toward a circumferential surface thereof at least during the rotation of the loose wound core.

A method of fabricating a loose wound core and a method of operating apparatus for bonding the loose wound core are also disclosed.

70 Claims, 20 Drawing Figures

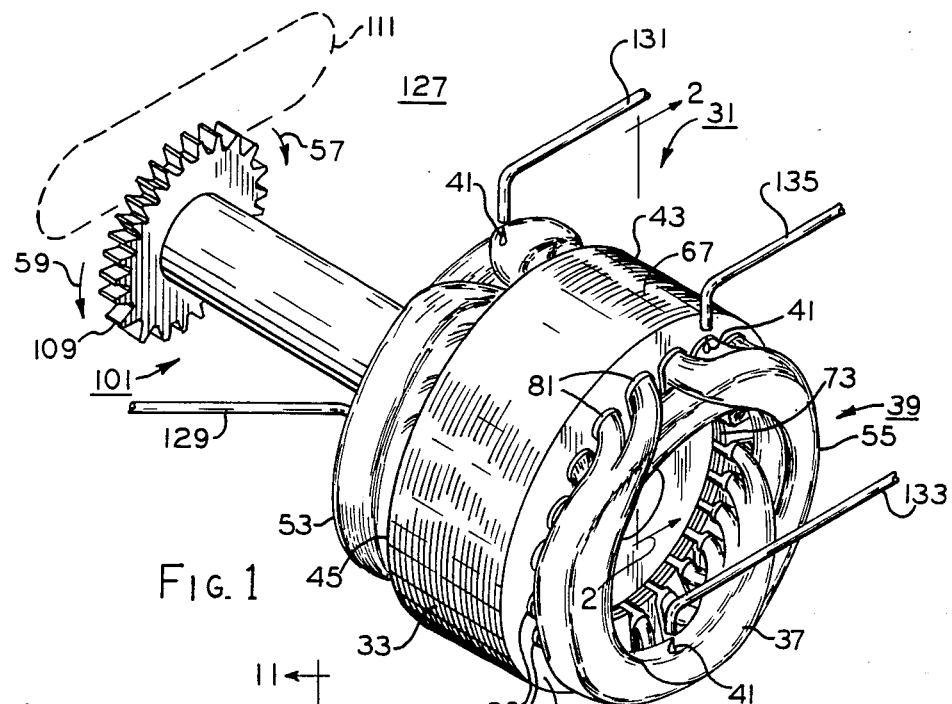

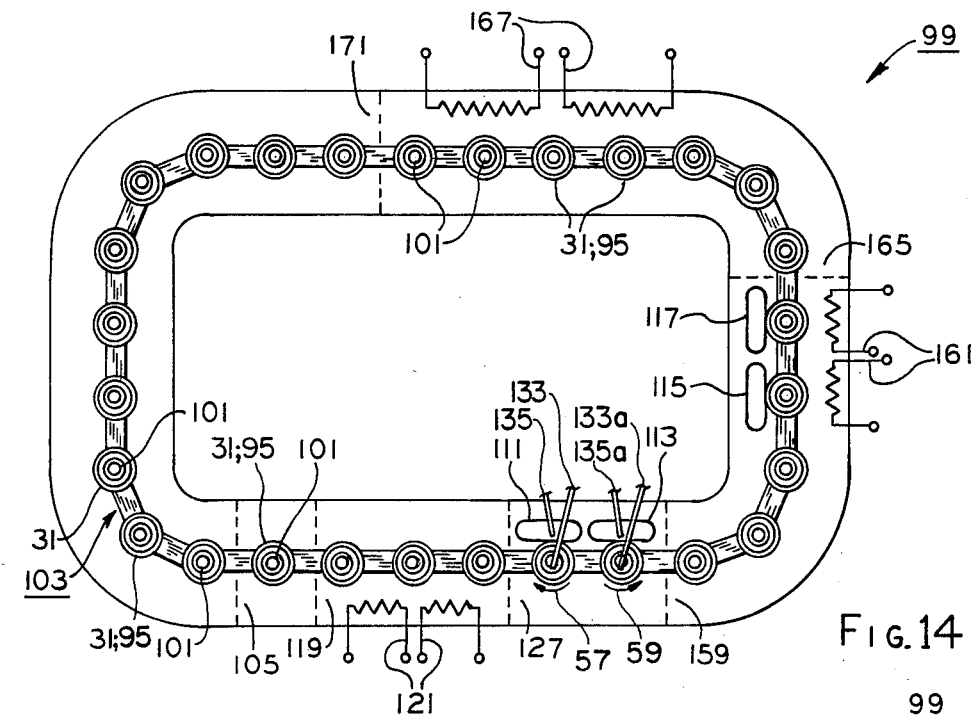
FIG.14
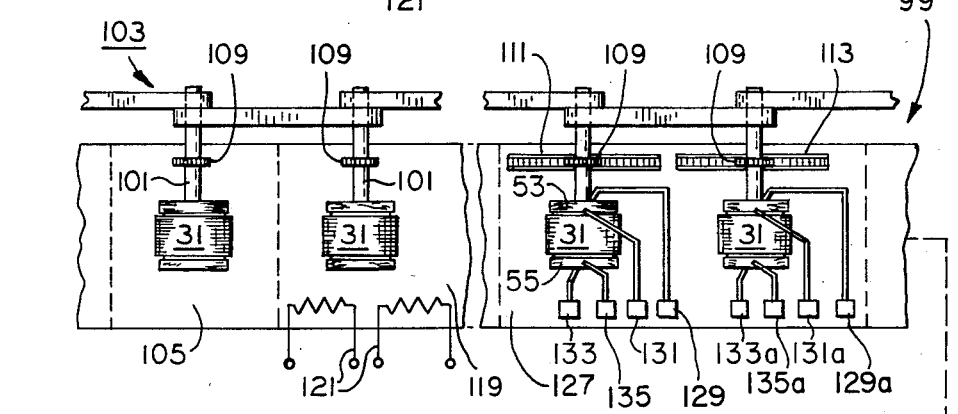
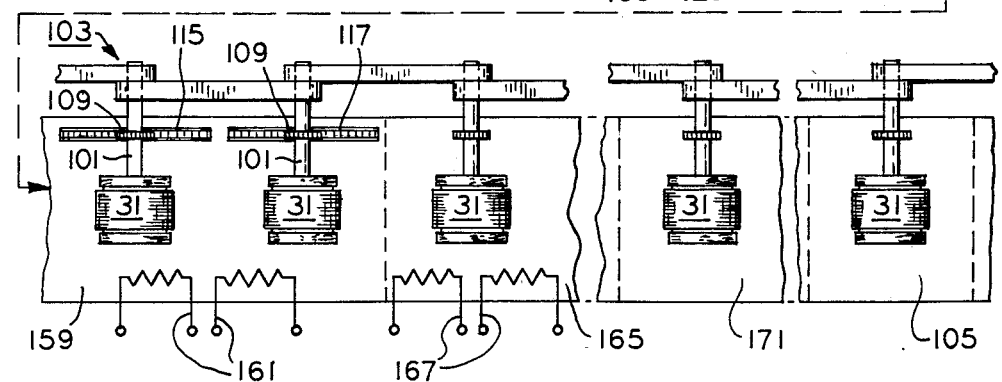
FIG.15

METHOD OF TREATING A LOOSE WOUND CORE, METHOD OF FABRICATING A LOOSE WOUND CORE, AND METHOD OF OPERATING APPARATUS

CROSS-REFERENCE TO RELATED APPLICATION

This application is related to the commonly assigned Joseph R. Gaietto and William J. Smith application Ser. No. 563,765 filed Dec. 21, 1983 (now U.S. Pat. No. 4,485,126 issued Nov. 27, 1984) concurrently herewith entitled "Method Of Treating Winding Means Of A Dynamoelectric Machine Core" which is incorporated by reference herein.

FIELD OF THE INVENTION

This invention relates in general to loose wound cores for use in a dynamoelectric machine and in particular to a method of treating a loose wound core, a method of fabricating a loose wound core, and a method of operating apparatus for bonding a loose wound core.

BACKGROUND OF THE INVENTION

In the past, various and sundry methods were employed to treat the windings of a dynamoelectric machine core, such as a stator or a rotor core for instance, and in some instances also the core itself, with a hardenable or curable liquid adhesive material. For instance, one typical past stator or core had laminations fixedly interconnected in a stack thereof by suitable means, such as welding, bonding, or cleating or the like for instance, and winding means associated with the stator included a plurality of coils having opposite side turn portions received in slots provided therefor in the stator and opposite end turn portions arranged in generally annular groupings thereof adjacent the opposite end faces of the stator. Of course, suitable insulation, such as slot liners or the like for instance, were provided in the stator slots to electrically insulate the opposite side turn portions of the coils from the stator, and suitable winding retaining means, such as slot wedges or the like for instance, were positioned in the stator slots to maintain the opposite side turn portions of the coils against displacement therefrom into the bore of the stator core. In some instances, the opposite end turn portions of the coils were laced or tied with twine in a manner well known to the art. Also in some instances, an insulating sleeve of a suitable material was placed over the lead ends of the winding means which emanated from various slots of the stator adjacent an opposite end face thereof.

In one of the past methods of treating the winding means associated with the above discussed past stator when the laminations thereof were fixedly interconnected together, such as by welding or cleating for instance as previously mentioned, the stator and winding means were baked or preheated to a preselected temperature sufficient to at least preanneal the winding means, and while at such an elevated temperature, the stator core and winding means were fully submersed or dipped into a bath of the liquid adhesive material. When later removed from the liquid adhesive material bath, the stator and winding means were transferred to a curing oven to be rebaked or reheated to effect the curing of the liquid adhesive material which had adhered to the stator core and winding means. In some instances, the stator and winding means may have been further redipped and rebaked. Of course, while the cured liquid adhesive material on the opposite end turn portions of the coils may have added some degree of rigidity thereto, it is believed that one of the disadvantageous or undesirable features of such past treatment method was that the stator slots may not have been adequately filled with the liquid adhesive material during the dipping of the stator so that the opposite side turn portions of the coils within the stator slots may not have been adequately saturated or encapsulated by the liquid adhesive material when cured. As a result, it is believed that the strength of the winding means in the stator may have been impaired and also that the opposite side turn portions of the coils may not have been rigidly contained within the stator slots. Further, it is also believed that another disadvantageous or undesirable feature of the past treatment method may have involved the loss, such as by dripping or the like for instance, of liquid adhesive material from the winding means during the transfer of the stator and winding means from the liquid adhesive material bath to a curing oven for baking, and it is also believed that such loss of liquid adhesive material may have created voids between the interstices of at least the opposite end turn portions of the coils serving to weaken them. Thus, it is also believed that when the winding means were energized in a dynamoelectric machine, the opposite end turn portions and opposite side turn portions of the coils may have been movable in response to such energization to an extent wherein the insulation thereon was worn or rubbed away causing short circuits in such winding means. Still another disadvantageous or undesirable feature of the past treatment method is believed to be that it may have been necessary to wipe excess liquid adhesive material from the opposite end faces and the peripheral or circumferential surface therebetween of the stator core prior to baking the stator and winding means to cure the liquid adhesive material thereon. A still further disadvantageous or undesirable feature of the past treatment method is believed to be that the insulating sleeves on the lead ends of the winding means may have had to be protected against contact with the liquid adhesive material in the bath thereof during the dipping of the stator and winding means. Still another disadvantageous or undesirable feature of the past treatment method is believed to be that there may not have been sufficient distribution of the liquid adhesive material throughout the winding means and also between the interfaces of the laminations of the core, as were as an evenness of such distribution so as to deleteriously affect the strength of the core upon the bonding thereof.

In another of the past methods of treating the winding means of the above discussed past stator when the laminations thereof the were bonded together by a bolt-down bonding process, as previously mentioned and as taught for instance in U.S. Pat. No. Re. 26,788 issued Feb. 10, 1970 to Bobbie B. Hull which is incorporated herein by reference, only the opposite end turns of the coils were dipped in the bath of the liquid adhesive material prior to baking to effect the cure of the liquid adhesive material. Although this past method of treating the winding means of such past bolt-down bonded stator undoubtedly had many salient features, it is believed that such past method may have had at least some of the same disadvantageous or undesirable features as the previously discussed past treating method.

Another typical past stator of the loose wound type was formed with loosely stacked laminations having the stator slots thereof maintained generally in alignment by the slot liners disposed in the stator slots, and the winding means were associated with this loose lamination stack generally in the same manner as discussed hereinabove. One of the past treating methods for this loose wound stator or core involved mounting an aligning mandrel or the like for instance in the bore of the loose lamination stack, and thereafter baking, fully or completely dipping, and then rebaking the loose wound stator generally in the same manner as discussed hereinabove. Of course, in this instance, it is believed that for the most part, the liquid adhesive material may have flowed by capillary action from the outer circumferential surface of the stator between the interfacing laminations of the loose stack thereof so as to bond the laminations and the winding means together when the loose wound stator was rebaked to effect the curing of the liquid adhesive material; however, albeit not disclosed or even suggested by the known prior art, it is also believed that the possibility might have existed wherein some of the liquid adhesive material may have been transferred from the slots of the stator by capillary action between the interfacing laminations of the loose stack thereof. Nevertheless, it is believed that this past method of treating the loose wound stator had at least generally the same disadvantageous or undesirable features as the previously discussed past treating methods.

Still another past method of treating a loose wound stator or core involved the bolt down bonding process as shown in U.S. Pat. No. 3,821,846 issued July 2, 1974 to Bernard J. Pleiss, Jr. In this past method, a plurality of bolts are extended through bolt holes provided therefor in the loose lamination stack of the loose wound stator so as to mount an opposite end face thereof against a bolt-down fixture. Thus, upon torquing of the bolts, the laminations of the loose stack thereof were forced or clamped together by the bolts generally in the vicinity of the bolt hole thereby to establish generally axial compression regions generally adjacent the bolt holes between the opposite end faces of the loose wound stator. When so mounted to the bolt-down fixture, the loose wound stator was preheated and then dipped into the bath of the liquid adhesive material to a depth submersing the lamination stack but not one of the opposite end turn portions of the coils adjacent the lead ends thereof. Thus, the one opposite end turn portions of the coils adjacent the lead ends thereof were not dipped, but liquid adhesive material was later applied thereto. Since the bore of the loose wound stator was mounted on the alignment mandrel, as previously mentioned, it is believed that for the most part liquid adhesive material may have penetrated by capillary action from the outer circumferential surface of the lamination stack between the interfacing laminations thereof so as to cover the interfacing surfaces thereof without regard to the clamping of the bolts or the axial compression regions established thereby; however, albeit not discussed or even suggested in the Pleiss, Jr. patent, it is believed that the possibility may have existed wherein some of the liquid adhesive material may have been transferred from the slots of the stator by capillary action between the interfacing laminations of the stack thereof. Thereafter, the loose wound core mounted to the bolt-down fixture was transferred to a curing oven to be baked and effect the curing of the liquid adhesive material adhering to the lamination stack and the winding means which, as previously mentioned, served to bond them together. Nevertheless, it is believed that this past method of treating the loose wound core has at least generally the same disadvantageous or undesirable features as the previously discussed past treating methods.

In yet another past method of treating the winding means of the above discussed past stator core in which the laminations were fixedly interconnected together, such as by welding, bonding or cleating for instance, as previously mentioned, the stator core was rotated in only one direction with the bore of the stator extending generally horizontally. During the rotation of the stator in only the one direction, the liquid adhesive material was dripped or trickled onto the opposite end turn portions of the coils of the winding means associated with the stator and flowed therefrom generally along the opposite side turn portions of the coils into the stator slots in which the opposite side turn portions of the coils were received. However, one of the disadvantageous or undesirable features of this past treating method is believed to be that because the stator was rotated in only the one direction, some of the slots of the stator were starved, i.e., not adequately filled, with the liquid adhesive material flowed thereinto. For instance, due to the rotation of the stator in only the one direction, it is believed that a greater amount of the liquid adhesive material dripped onto the opposite end turn portions of the coils flowed therefrom generally along one of the opposite side turn portions of the coils into the stator slots in which the one opposite side turn portions of the coils were received while a lesser amount of the liquid adhesive material flowed generally along the other of the opposite side turn portions of the coils into the slots of the stator in which the other opposite side turn portions of the coils were received thereby, in effect, serving to starve such stator slots in which the other opposite side turn portions of the coils were received of an equal liquid adhesive material fill. In other words, due to the rotation of the stator in only the one direction, it is believed that the dripped liquid adhesive material had a gravitational tendency to flow "downhill" on the opposite end turn portions of the coils, i.e., in the direction of rotation of the stator, and then along the one opposite side turn portions of the coils into the stator slots receiving them, but the liquid adhesive material was at least inhibited with respect to flow "uphill" on the opposite end turn portions of the coils, i.e., against the rotation of the stator in only the one direction; therefore, the stator slots in which the other opposite side turn portions of the coils were received were generally starved of the liquid adhesive material, i.e., received the lesser amount of the liquid adhesive material dripped onto the opposite end turn portions of the coils in response to the rotation of the stator in only the one direction.

SUMMARY OF THE INVENTION

Among the several objects of the present invention may be noted the provision of an improved method of treating a loose wound core, an improved method of fabricating a loose wound core, and an improved method of operating apparatus for bonding a loose wound core which overcome the above discussed disadvantageous or undesirable features, as well as others, of the prior art; the provision of such improved methods which effect a stronger and more uniform bond of the laminations and the winding means of the loose wound core; the provision of such improved methods in which a liquid adhesive material flowed from the opposite end turn portions of the winding means coils to the opposite side turn portions thereof received in slots provided therefor in a lamination stack of the loose wound core is passed only from the slots into wetting relation between the interfacing surfaces of the laminations in the lamination stack generally toward a circumferential surface thereof by capillary action; the provision of such improved methods in which the loose wound core is rotated in both one direction and another direction opposite thereto not only to insure generally complete filling of the slots with the liquid adhesive material flowed thereinto but also to insure evenness of distribution of the liquid adhesive material in both the winding means and the lamination stack of the loose wound core; the provision of such improved method in which little, if any, of the liquid adhesive material is accumulated on the circumferential surface of the lamination stack or on the opposite end faces thereof; the provision of such improved methods in which the liquid adhesive material is passed between overlaying portions of slot liners and slot wedges surrounding the opposite side turn portions of the winding means coils within the slots of the lamination and from the slots generally by capillary action into the wetting relation between the interfacing surfaces of the laminations in the lamination stack; the provision of such improved methods in which the winding means and the lamination stack of the loose wound core are generally completely saturated with the liquid adhesive material; the provision of such improved methods wherein the filleting or webbing of the liquid adhesive material, upon the curing thereof within the interstices between the opposite side turn and end turn portions of the coils, is such as to achieve the aforementioned stronger and more uniform bond of the winding means in the core; and the provision of such improved methods in which the components utilized therein are simplistic in design, easily assembled and economically manufactured. These as well as other objects and advantageous features of the present invention will be in part apparent and in part pointed out hereinafter.

In general, a method is provided in one form of the invention for treating a loose wound core for a dynamoelectric machine with a hardenable liquid adhesive material adapted for bonding the loose wound core. The loose wound core includes a plurality of laminations arranged in interfacing relation with each other in a generally loose stack thereof, a pair of opposite end faces on the lamination stack, a circumferential surface on the lamination stack between the opposite end faces thereof, and a plurality of slot means extending through the lamination stack between the opposite end faces thereof for receiving winding means of the loose wound core. The winding means has a plurality of sets of coils, and each coil having at least one conductor turn with opposite side turn portions of the coils received in the slot means and with opposite end turn portions of the coils arranged generally adjacent the opposite end faces, respectively. In practicing this method, the loose wound core is rotated in one direction and another direction opposite thereto, and the liquid adhesive material is dispensed onto the opposite end turn portions of the coils at least during the rotation of the loose wound core in the one and another directions. The liquid adhesive material is flowed from the opposite end turn portions of the coils generally along the opposite side turn portions of the coils into the slot means of the lamination stack in which the opposite side turn portions of the coils are received, and the liquid adhesive material is passed from the slot means generally by capillary action into wetting relation between the laminations in the interfacing relation thereof and at least generally toward the circumferential surface of the lamination stack in response to the rotation of the loose wound core in the one and another directions.

Further in general and in one form of the invention, a method is provided for fabricating a loose wound core with the loose wound core including a plurality of laminations each having a plurality of slot means for receiving coils of winding means of the loose wound core with the laminations and winding means being adapted to be bonded together by a hardenable liquid adhesive material. In practicing this method, the laminations are associated generally loosely in a stack thereof, and the slot means are generally axially aligned through the laminations in the stack thereof, respectively. Opposite parts of the coils are positioned in the slot means, and other opposite parts of the coils are arranged generally adjacent the opposite ends of the lamination stack so as to comprise at least in part the loose wound core, respectively. The loose wound core is rotated in one direction and another direction opposite thereto. The liquid adhesive material is dispensed onto the other opposite parts of the coils flowed therefrom generally along the first named opposite parts of the winding coils into the slot means of the lamination stack in which the first named opposite parts of the coils are received in response to the rotation of the loose wound core in the one and another directions, and some of the liquid adhesive material is passed from the slot means of the lamination stack into wetting relation between the laminations in the lamination stack generally by capillary action. The liquid adhesive material contained in the coils and the lamination stack is cured to effect the hardening of the liquid adhesive material thereby to bond together in a generally unitary mass the winding means and the lamination stack of the loose wound core.

Also in general, a method is provided in one form of the invention for operating apparatus for bonding a loose wound core with a liquid adhesive material into a generally unitary mass. The apparatus has a plurality of work stations and a pair of sets of means operable generally for dispensing the liquid adhesive material. The loose wound core comprises a plurality of laminations respectively arranged generally in interfacing relation in a stack thereof with the lamination stack having a pair of opposite end faces, and a plurality of slot means extend generally axially through the lamination stack between the opposite end faces thereof for receiving winding means of the loose wound core, respectively. The winding means includes a plurality of coils having at least one conductor turn with opposite side turn portions of the coils received in the slot means of the lamination stack and with opposite end turn portions of the coils arranged generally in annular groupings thereof adjacent the opposite end faces of the lamination stack, respectively. In practicing this method, the loose wound core is progressively moved between a plurality of preselected indexed positions through the work stations of the apparatus, and the loose wound core is preheated upon the movement thereof through at least one of the work stations of the apparatus. The loose wound core is rotated in at least one direction in at least one of the preselected indexed positions thereof and in at least another direction opposite the one direction in at least another of the preselected indexed positions thereof upon the movement of the loose wound core through at least another of the work stations of the apparatus, and the dispensing means are operated at the at least another work station to dispense liquid adhesive material onto the opposite end turns of the coils of the loose wound core during at least a part of the rotation of the loose wound core in the one and another directions in the at least one and another preselected indexed positions thereof at the at least another work station of the apparatus, respectively. The liquid adhesive material is flowed from the opposite end turns of the coils generally along the opposite side turn portions of the coils into the slot means of the loose wound core in which the opposite side turn portions of the coils are received, and some of the liquid adhesive material is passed from the slot means by capillary action into wetting relation between the laminations in the interfacing relation thereof in the loose wound core at least during the rotation thereof in the one and another directions in the at least one and another preselected indexed positions thereof at the at least another work station of the apparatus, respectively. The loose wound core is further heated upon its movement through at least another one of the work stations of the apparatus, and the liquid adhesive material in the loose wound core is thereby cured to effect the hardening of the liquid adhesive material so as to bond the winding means and the laminations of the loose wound core into the generally unitary mass thereof.

BRIEF DESCRIPTION OF THE DRAWINGS

FIG. 1 is an isometric view of a loose wound core and an alignment sleeve therefor mounted to a rotatable mandrel at a dispensing station of an apparatus for effecting the bonding thereof and illustrating principles which may be practiced in a method of treating a loose wound core for a dynamoelectric machine in one form of the invention and a method of fabricating a loose wound core also in one form of the invention;

FIG. 2 is a partial sectional view taken along line 2—2 in FIG. 1;

FIG. 3 is a partial sectional view illustrating the stacking of a plurality of laminations in face-to-face relation into a generally loose stack thereof on an alignment arbor;

FIG. 14 is a schematic side elevational view of the apparatus for effecting the bonding of the loose wound core and illustrating principles which may be practiced in a method of operating apparatus for bonding a loose wound core in one form of the invention;

FIG. 15 is a diagrammatic view illustrating in flow-through form the operation of the apparatus of FIG. 14;

Corresponding reference characters indicate corresponding parts throughout the several views of the drawings.

The exemplifications set out herein illustrate the preferred embodiments of the invention in one form thereof, and such exemplifications are not to be construed as limiting in any manner the scope of the invention or the scope of the disclosure thereof.

DETAILED DESCRIPTION OF THE PREFERRED EMBODIMENTS

Figure 4:
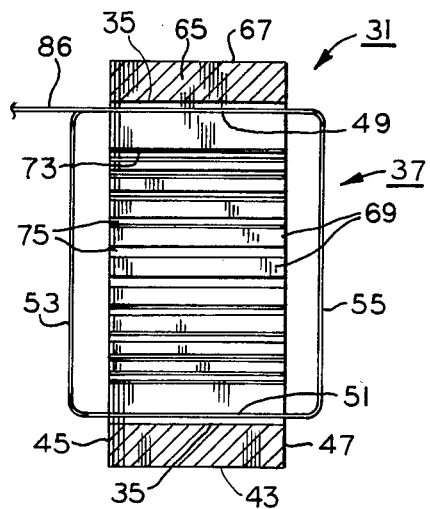
FIG. 4 is a schematic sectional view of the loose wound core of FIG. 1 illustrating the insertion of one coil of the winding means of the loose wound core into the loose lamination stack thereof.

With reference to the drawings in general, there is illustrated in one form of the invention a method of fabricating or manufacturing a loose wound core or stator 31 adapted for use in a dynamoelectric machine (not shown), and the loose wound core includes a plurality of laminations 33 each having a plurality of slots or slot means 35 for receiving a plurality of coils 37 of winding means 39 in the loose wound core with the laminations and the winding means being adapted to be bonded together into a generally unitary mass by a hardenable liquid adhesive material 41 adapted to be associated therewith, respectively (FIGS. 1 and 2). In practicing this method, laminations 33 are associated or arranged generally loosely in a stack 43 thereof having a pair of opposite end faces 45, 47, and slots 35 are generally axially aligned through the laminations between the opposite end faces of the loose lamination stack, respectively (FIG. 3). Opposite parts, such as for instance a pair of opposite side turn portions 49, 51, of coils 37 are positioned in slots 35 of loose lamination stack 43, and other opposite parts, such as for instance a pair of opposite end turn portions 53, 55, of the coils are arranged generally adjacent opposite end faces 45, 47 of the loose lamination stack, respectively, thereby to comprise at least in part loose wound core 31 (FIGS. 2 and 4). Loose wound core 31 is rotated in preselected sequences in one direction and another direction opposite thereto, as illustrated by clockwise and counter-clockwise directional arrows 57, 59 (FIG. 1). Liquid adhesive material 41 is dispensed onto opposite end turn portions 53, 55 of coils 37 with the liquid adhesive material flowing therefrom generally along opposite side turn portions 49, 51 of the coils into slots 35 of loose lamination stack 43 in which the opposite side turn portions of the coils are received in response to the rotation of loose wound core 31 in the one and another directions of directional arrows 57, 59, respectively, and some of the liquid adhesive material is passed from the slots of the loose lamination stack into wetting relation between laminations 33 in the loose lamination stack generally by capillary action (FIGS. 1 and 5–8). Liquid adhesive material 41 contained in coils 37 and loose lamination stack 43 is cured to effect the hardening of the liquid adhesive material and thereby the bonding together into the generally unitary mass of winding means 39 and the loose lamination stack of loose wound core 31 is effected (FIG. 1).

Figure 7:
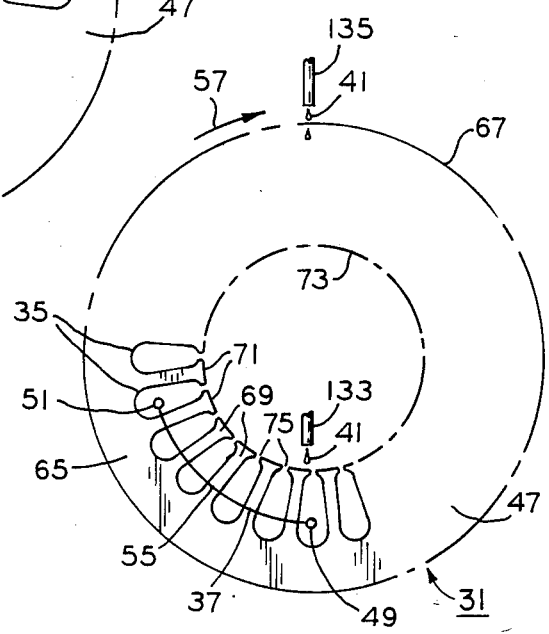
Figure 8:
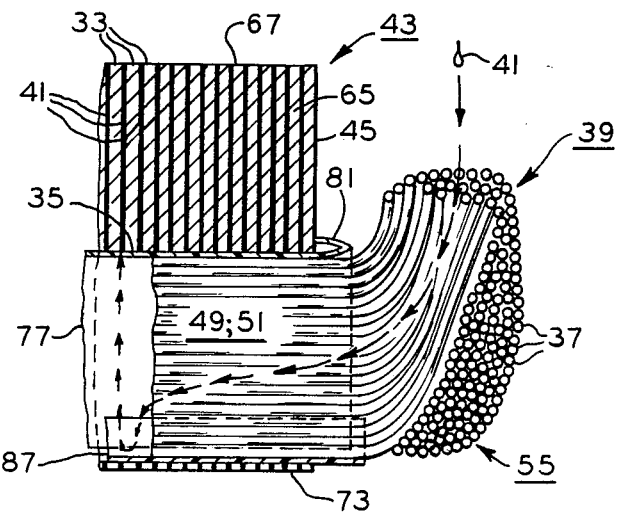
FIG. 8 is an enlarged partial sectional view taken from FIG. 2 and illustrating the flow generally by capillary action of liquid adhesive material into wetting relation between the laminations in their face-to-face relation in the loose wound core.
Figure 9:
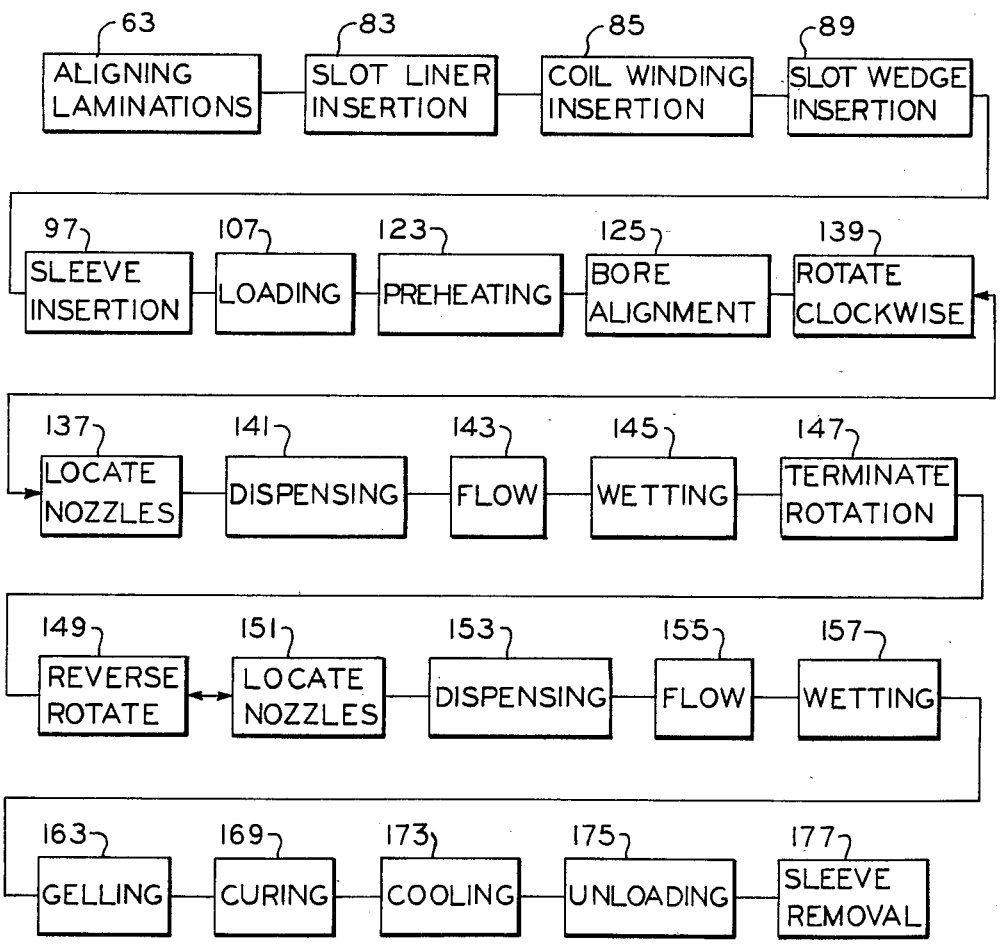
FIG. 9 is a functional box diagram illustrating the methods of the invention, respectively.

More particularly and with specific reference to FIGS. 1–9, laminations 33 may be lanced or otherwise formed from a suitable material, such as a generally thin ferromagnetic sheet material or the like for instance, and the laminations are arranged in loose stack 43 thereof on suitable fixturing, such as an alignment arbor 61 or the like for instance, as shown in FIG. 3 and as illustrated in a functional diagram box 63 in FIG. 9. It is contemplated that laminations 33 may be assembled or otherwise associated in loose stack 43 thereof on alignment arbor 61 either manually by an operator or by various conventional equipment (not shown) as is well known to the art, within the scope of the invention so as to meet at least some of the objects thereof. When so mounted to a preselected stack height on alignment arbor 61, laminations 33 are arranged generally in interfacing or face-to-face relation in loose stack 43 thereof, and slots 35 are aligned so as to extend generally axially through the loose lamination stack between opposite end faces 45, 47 thereof, respectively. In this aligned relation, loose lamination stack 43 has a yoke section 65 extending between opposite end faces 45, 47 and bounded by a circumferential or outer peripheral surface 67 of the loose lamination stack, and a plurality of generally arcuately spaced apart teeth 69 are integrally formed with the yoke section extending generally radially inwardly therefrom so as to define slots 35 in the loose lamination core between adjacent ones of the teeth, as best seen in FIGS. 2 and 4–6. Teeth 69 have a plurality of tips 71 on the free ends thereof defining in part a bore 73 which extends generally axially through loose lamination stack 43 intersecting with opposite end faces 45, 47 thereof, and a plurality of slot entrances or passages 75 are defined between adjacent ones of the tooth tips communicating between slots 35 and the bore, respectively. Although laminations 33 and loose stack 43 thereof are illustrated herein for purposes of disclosure, it is contemplated that various other laminations having different configurations and/or formed into a loose stack thereof in various other different manners, such as for example a strip lamination edgewise wound into a loose stack thereof, may be utilized within the scope of the invention so as to meet at least some of the objects thereof.

Figure 10:
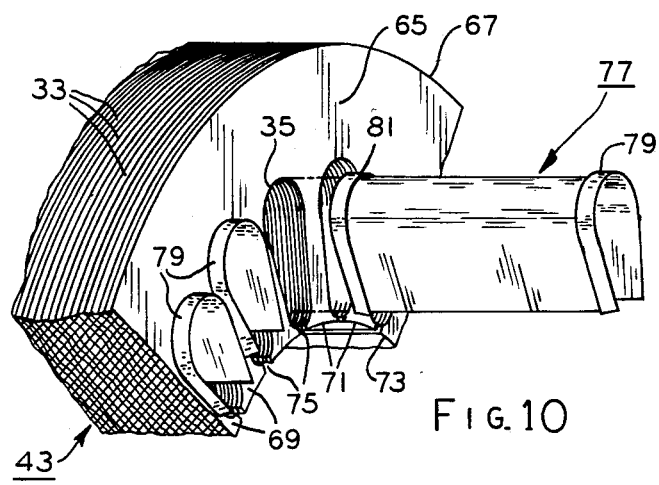
FIG. 10 is a partial isometric view illustrating the insertion of slot liners in respective slots of the loose lamination stack.

With slots 35 maintained at least generally in the axial alignment thereof through loose lamination stack 43, as discussed above, a plurality of slot liners or slot means insulators 77 may be inserted or otherwise placed into the slots with the slot liners having opposite means, such as a pair of cuffs 79, 81 or the like for instance, for abutment or displacement preventing engagement with opposite end faces 45, 47 at least in part about the slots intersecting therewith, respectively, as best seen in FIGS. 2 and 10. As illustrated herein for purposes of disclosure, slot liners 77 are shaped and formed of suitable material having desired dielectric properties, such as a Mylar sheet material or the like for instance as is well known in the art which is available from E. I. du Pont de Nemours And Company, Wilmington, Delaware; however, it is contemplated that various other slot liners having various different configurations and formed from various other different dielectric materials may be utilized within the scope of the invention so as to meet at least some of the objects thereof. Thus, when slot liners 77 are mounted within slots 35 of loose lamination stack 43, as discussed above, the slot liners not only maintain the slots generally in the axial alignment thereof through the loose lamination stack but also retain laminations 33 generally against axial displacement from the loose lamination stack by the engagement of slot liner cuffs 79, 81 with opposite end faces 41, 43 of the loose lamination stack, as discussed above and as well known to the art. If a more detailed discussion of the alignment of loose lamination stack 43 and the association of slot liners 77 therewith is desired, reference may be had to British Pat. No. 1,192,791 published May 20, 1970 and U.S. Pat. No. 4,247,978 issued Feb. 3, 1981 to Chester A. Smith, and each of the aforementioned patents is incorporated by reference herein. The disposition of slot liners 77 in slots 35 of loose lamination stack 43 is illustrated by a functional diagram box 83 in FIG. 9. Albeit not shown for purposes of drawing simplicity, it is contemplated that the above discussed placement of slot liners 77 into slots 35 of of loose lamination stack 43 may be accomplished by various suitable means, such as for instance manually by an operator or by various conventional equipment well known to the art, within the scope of the invention so as to meet at least some of the objects thereof.

When slot liners 77 are so assembled with loose lamination stack 43 in the containing or displacement preventing association therewith, as discussed above, winding means 39 may be wound or otherwise placed or inserted into slots 35 of the loose lamination stack on any suitable conventional coil winding and/or coil placing equipment (not shown) as is well known to the art. This association of winding means 39 with loose lamination stack 43 is illustrated by a functional diagram box 85 in FIG. 9. As may be best seen in FIGS. 2 and 4, upon the aforementioned association of winding means 39 with loose lamination stack 43, opposite side turn portions 49, 51 of coils 37 in the winding means are received within slot liners 77 arranged in slots 35 of the loose lamination stack thereby to electrically insulate the winding means from the slots, and opposite end turn portions 53, 55 of the coils in the winding means are arranged in generally annular groupings thereof generally about bore 73 of the loose lamination stack so as to be spaced adjacent opposite end faces 45, 47 thereof, respectively. As illustrated schematically in FIG. 4, each coil 37 of winding means 39 includes at least one turn or loop of a conductor 86 which, of course, may be a suitably enameled, electrical conductive wire. Albeit not shown for purposes of drawing simplicity, it is contemplated that, if desired or if necessary, opposite end turn portions 53, 55 of coils 37 may be shaped and/or pressed back into the generally annular groupings thereof adjacent opposite end faces 45, 47 of loose lamination stack 43 by suitable conventional equipment well known to the art within the scope of the invention so as to meet at least some of the objects thereof.

Figure 11:
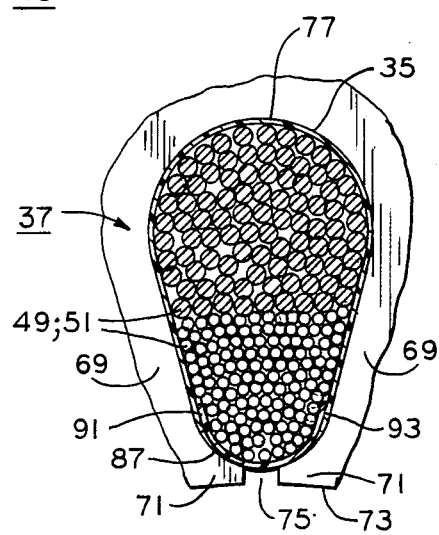
FIG. 11 is an enlarged partial sectional view taken along line 11—11 of FIG. 2.
Figure 12:
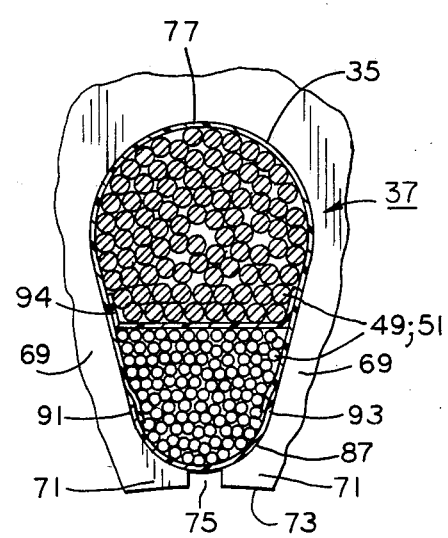
FIG. 12 is the same as FIG. 11 but illustrating the slot wedge interposed between the slot liner and a tooth tip portion of the loose wound core within a slot thereof as well as a phase insulation part within the slot.

Either generally simultaneously with the association of winding means 39 with loose lamination stack 43 or subsequent thereto, a plurality of means, such as slot wedges 87 or the like for instance, may be disposed or otherwise placed or inserted at least in part within slots 35 in engagement therewith and with adjacent ones of tooth tips 71 for maintaining opposite side turn portions 49, 51 of coils 37 against displacement from the slots through slot entrances 75 between the adjacent tooth tips toward bore 73 of the loose lamination stack, as best seen in FIGS. 2 and 11. This placement of slot wedges 87 within slots 35 of loose lamination stack 43, as discussed above, is illustrated by a functional diagram box 89 in FIG. 9. As best seen in FIG. 11, a pair of opposite side edges or margins 91, 93 of slot wedges 87 are arranged in part in overlaying relation with adjacent tooth tips 71 and with opposite confronting or overlaying parts of slot liners 77 within slots 35 adjacent the tooth tips, and the slot wedges extend across slot entrances 75 between the tooth tips thereby to contain opposite side turn portions 49, 51 of coils 37 within the slots and against displacement therefrom through the slot entrances, respectively. It is also contemplated that slot wedges 87 may be arranged in slots 35 in part in overlaying relation with slot liners 77 therein with opposite margins 91, 93 of the slot wedges being abutted or extending between confronting parts of the slot liners in slots 35 and adjacent ones of tooth tips 71, respectively, as best seen in FIG. 12. Further, as also illustrated in FIG. 12, a part of a strip 94 of phase insulating means is provided in slot 35, and if a more complete discussion of such phase insulating means is desired reference may be had to the aforementioned concurrently filed application Ser. No. 563,765 (now U.S. Pat. No. 4,485,126) of Joseph R. Gaietto and William J. Smith. As illustrated herein for purposes of disclosure, slot wedges 87 are shaped and formed of suitable material having desired dielectric properties, such as Mylar sheet material or the like for instance; however, it is contemplated that various other slot wedges having various different configurations and formed from various other different materials, such as for example magnetic slot wedges or the like, may be utilized within the scope of the invention so as to meet at least some of the objects thereof. Albeit not shown for purposes of drawing simplicity, it is contemplated that the above discussed association of slot wedges 87 with loose lamination stack 43 may be acomplished by various suitable means, such as for instance manually by an operator or by various suitable conventional equipment well known in the art, within the scope of the invention so as to meet at least some of the objects thereof. Thus, upon the association of winding means 39, slot liners 77 and slot wedges 87 with loose lamination stack 43, as discussed hereinabove, the resulting structure comprises or constitutes loose wound core 31.

Figure 13:
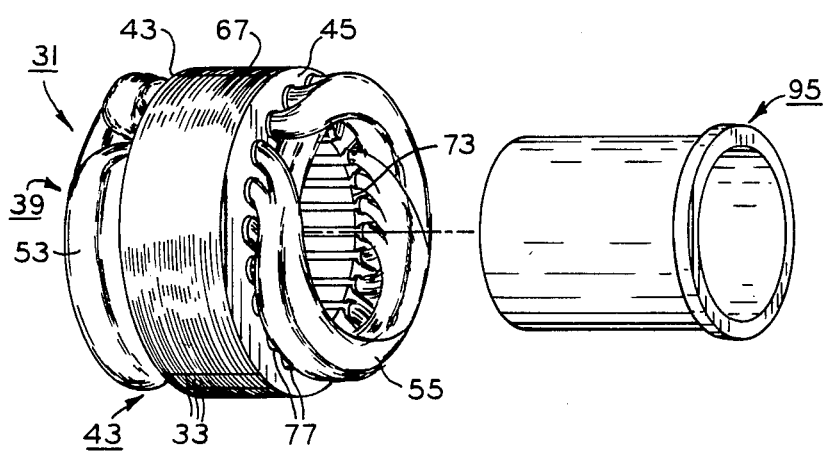
FIG. 13 is a partial isometric view illustrating the insertion of an aligning sleeve into a bore of the loose wound core.

After loose wound core 31 has been assembled as discussed above, means, such as a generally cylindric alignment or aligning arbor or sleeve 95 or the like for instance, may be associated with the loose wound core for effecting or insuring axial alignment of bore 73 thereof, as best seen in FIG. 13. Sleeve 95 is formed of a metal, such as aluminum for instance, having a coefficient of expansion greater than that of the material from which laminations 33 are formed, and if desired, the sleeve may be anodized to provide it with an aluminum oxide surface or coating. Sleeve 95 may be manually placed or axially inserted into bore 73 of loose wound core 31, and the outside diameter of the sleeve is predeterminately less than the diameter of the bore so as to effect generally a slip fit therebetween. Thus, when sleeve 95 is mounted within bore 73 of loose wound core 31, tooth tips 71 on laminations 33 of loose lamination stack 41 in the loose wound core are disposed about the sleeve at least adjacent thereto. As discussed in greater detail hereinafter, when sleeve 95 and loose wound core 31 are conjointly heated within a preselected temperature range, sleeve 95 expands into axial aligning engagement with tooth tips 71 on laminations 33 in loose lamination stack 43 of loose wound core 31 thereby to effect generally radial shifting of at least some of the laminations with respect to others thereof and the axial alignment of bore 73 defined at least in part by the tooth tips through the loose lamination stack of the loose wound core. This association of sleeve 95 with bore 73 of loose wound core 31 is illustrated by a functional diagram box 97 in FIG. 9. If a more detailed discussion of sleeve 95 and its operational characteristics is desired, reference may be had to U.S. Pat. No. 3,845,547 issued Nov. 5, 1974 to Hugh B. Reynolds which is incorporated herein by reference. While sleeve 95 is illustrated herein to effect the axial alignment of bore 73 in loose wound core 31 for purposes of disclosure, it is contemplated that various other means may be utilized to effect such bore alignment within the scope of the invention so as to meet at least some of the objects thereof.

In FIGS. 14 and 15, an apparatus 99 is schematically illustrated for effecting the bonding of winding means 39 and loose lamination stack 43 of loose wound core 31 into the aforementioned generally unitary mass. Apparatus 99 has a plurality of means, such as rotatable mandrels 101 or the like for instance, each operable generally for mounting at least one of the aforementioned assembly of sleeve 95 and loose wound core 31 and effecting the rotation thereof in the opposite directions of rotational arrows 57, 59 in preselected sequences as the mandrels are drivingly moved or indexed between preselected indexed positions in a preselected periodic or timed sequence or operation through the apparatus by an indexing or driving means, such as an endless chain drive 103 or the like for instance, to which the mandrels are mounted, as discussed hereinafter in detail. However for the sake of simplicity of disclosure, the passage of only one of mandrels 101 through apparatus 99 is discussed hereinafter.

At a loading and unloading station or chamber 105 of apparatus 99, the assembly of sleeve 95 and loose wound core 31 is loaded onto one of mandrels 101 presented at the loading station; and albeit not shown for purposes of drawing simplicity, it is contemplated that such assembly may be loaded onto the mandrel either manually by an operator or by suitable conventional equipment well known to the art within the scope of the invention so as to meet at least some of the objects thereof. When so loaded onto mandrel 101, sleeve 95, with loose wound core 31 disposed thereon in the manner discussed hereinabove, is removably secured or otherwise mounted to the mandrel by suitable conventional means associated therewith, such as a chucking device (not shown) or the like for instance. While only one assembly of sleeve 95 and loose wound core 31 is illustrated as being mounted onto mandrel 101, it is, of course, contemplated that more than one such assembly may be mounted onto such mandrel within the scope of the invention so as to meet at least some of the objects thereof. When the assembly of sleeve 95 and loose wound core 31 is so removably mounted or chucked onto mandrel 101, the centerline or rotational axis of the mandrel is disposed in a preselected position or attitude extending in a horizontal plane (not shown); however, it is contemplated that such axis of the mandrel may be angularly disposed to a desired degree with respect to the aforementioned horizontal plane within the scope of the invention so as to meet at least some of the objects thereof. Furthermore, although the assembly of sleeve 95 and loose wound core 31 is illustrated herein for purposes of disclosure as being removably mounted onto mandrel 101, it is contemplated that various other means, such as an expandable chucking device or the like for instance, associated with the mandrel may be utilized instead of the sleeve for directly receiving the bore of the loose wound core in removable mounting engagement on the mandrel and also for effecting the axial alignment of such bore within the scope of the invention so as to meet at least some of the objects thereof. The loading of the assembly of sleeve 95 and loose wound core 31 onto mandrel 101 at loading and unloading station 105 of apparatus 99 is illustrated by a functional diagram box 107 in FIG. 9.

Each mandrel 101 includes a sprocket 109 arranged to be moved into driven relation with a plurality of endless chain drives, such as those indicated for example at 111, 113, 115, 117 in apparatus 99, to effect the rotation of the mandrel in preselected sequences in the opposite directions of rotational arrows 57, 59 as the mandrel is indexed by driving means 103 therefor through the apparatus. While endless chain drives 111-117 are illustrated herein for purposes of disclosure as being drivingly engageable with sprocket 109 of mandrel 101 to effect its rotation in a selected direction, it is contemplated that more or less of such chain drives may be employed in apparatus 99, as desired, and also that other suitable conventional means may be utilized in the apparatus to effect the rotation of the mandrels in the opposite directions indicated by rotational arrows 57, 59 in any desired sequence of such rotations within the scope of the invention so as to meet at least some of the objects thereof.

Upon the removable mounting of the assembly of sleeve 95 and loose wound core 31 onto mandrel 101 at loading and unloading station 105 of apparatus 99, as discussed above, the mandrel is indexed therefrom by the operation of driving means 103 through a preheating station or chamber 119 of the apparatus, and a set of heating devices, such as electrical or infrared heating elements 121 or the like for instance, are arranged in the preheating station for heat transfer relation with such assembly as it is indexed through the preheating station. Of course, mandrel 101 may be moved through any number of preselected indexed positions within preheating station 119 as may be desired or necessary to raise the temperature of the assembly of sleeve 95 and loose wound core 31 on the mandrel at least to a preselected value. Albeit not shown for purposes of drawing simplicity, it is contemplated that means, such as at least another chain drive or the like for instance similar to chain drives 111-117, may be provided in preheating station 119 of apparatus 99 for driving association with sprocket 107 of mandrel 101 thereby to effect its rotation in at least one of the opposite directions indicated by rotational arrows 57, 59 as the mandrel passes through at least some of the indexed positions thereof within the preheating station. As previously mentioned due to the difference in the coefficients of expansion of the metals of sleeve 95 and laminations 33, the sleeve expands radially outwardly into abutment with tooth tips 71 of laminations 33 in loose lamination stack 43 of loose wound core 31 in response to the heat established and transferred thereto by heating devices 121 in preheating station 119 of apparatus 99 thereby to effect the axial alignment of bore 73 through the loose wound core. Of course, since laminations 33 are only loosely contained by slot liners 77 in loose lamination stack 43, as discussed hereinabove, at least some of the laminations are generally radially or adjustably movable with respect to others thereof in the loose lamination stack in response to the heat effected expansion and axial aligning abutment of sleeve 95 with tooth tips 71 of the laminations. It may be noted that the engagement of sleeve 95 with tooth tips 71 of laminations 33 not only effects the alignment of bore 73 through loose wound core 31 but also serves to maintain such tooth tips free of any liquid adhesive material 41 dispensed onto winding means 39, as discussed hereinafter. The preheating of the assembly of sleeve 95 and loose wound core 31 on mandrel 101 upon the passage thereof through preheating station 119 of apparatus 99 is illustrated by a functional diagram box 123 in FIG. 9, and the axial alignment of bore 73 through loose wound core 31 is illustrated by another functional diagram box 125 in FIG. 9. Of course, the preheating of loose wound core 31 not only effects the above discussed bore aligning operation of sleeve 95 but also is desirable to enhance the flow through winding means 39 of liquid adhesive material 41 dispensed thereonto, as discussed in greater detail hereafter.

Subsequent to preheating the assembly of sleeve 95 and loose wound core 31 on mandrel 101 in preheating station 119, as discussed above, driving means 103 is operable to index the mandrel from the preheating station into a liquid adhesive material dispensing station or chamber 127 of apparatus 99. As best seen in FIG. 1, a pair of sets of means, such as protractively and retractively movable nozzles 129, 131, 133, 135 or the like for instance, are provided at dispensing station 127 for dispensing liquid adhesive material 41 onto opposite end turn portions 53, 55 of winding means 39 on loose wound core 31. Thus, when mandrel 101 with sleeve 95 and loose wound core 31 mounted thereon is moved into the indexed position thereof at dispensing station 127, sprocket 109 is associated in driven engagement with endless chain drive 111 thereby to effect the driven rotation of the mandrel in the clockwise direction, as indicated by rotational arrow 57 and as illustrated by a functional diagram box 137 in FIG. 9, and dispensing means or nozzles 129, 131, 133, 135 may be adjustably or protractively moved by suitable conventional means (not shown) into preselected protracted positions or locations with respect to opposite end turn portions 53, 55 of winding means 39 on loose wound core 31, as shown in FIG. 1 and as illustrated by a functional diagram box 139 in FIG. 9. Of course, it is contemplated that nozzles 129–135 may be moved toward their preselected protracted positions either before, after or generally simultaneously with the indexing movement of mandrel 101 with sleeve 95 and loose wound core 31 thereon toward the preselected indexed position thereof at dispensing station 127. In these preselected positions, nozzles 129, 133 are disposed adjacent the inner circumferential surface or section of opposite end turn portions 53, 55 of coils 37 in winding means 39 so as to be generally spaced adjacent opposite end faces 45, 47 of loose wound core 31, and nozzles 131, 135 are disposed adjacent the outer circumferential surface or section of the opposite end turn portions of the winding means in the opposite annular groupings thereof so as to be axially spaced generally between the opposite free ends of such groupings and the opposite end faces of the loose wound core, respectively. While these preselected positions of nozzles 129–135 for dispensing liquid adhesive material 41 onto opposite end turn portions 53, 55 of coils 37 in winding means 39 are illustrated herein for purposes of disclosure, it is contemplated that fewer or more of such nozzles may be utilized and located at various other preselected positions with respect to the opposite end turn portions of the coils in the winding means within the scope of the invention so as to meet at least some of the objects thereof. While liquid adhesive material 41 hereof for purposes of disclosure may be a formula Y390PS solvent base varnish (with a solid content in a range of between generally about 9% and about 38%) available from the Sterling Division of Reichhold Chemicals, Inc., Sewickley, PA, it is contemplated that various other liquid adhesive materials, such as solvent or water based varnishes or the like for instance and having either the same or different solid contents than mentioned above, may be utilized within the scope of the invention so as to meet at least some of the objects thereof.

Figure 5:
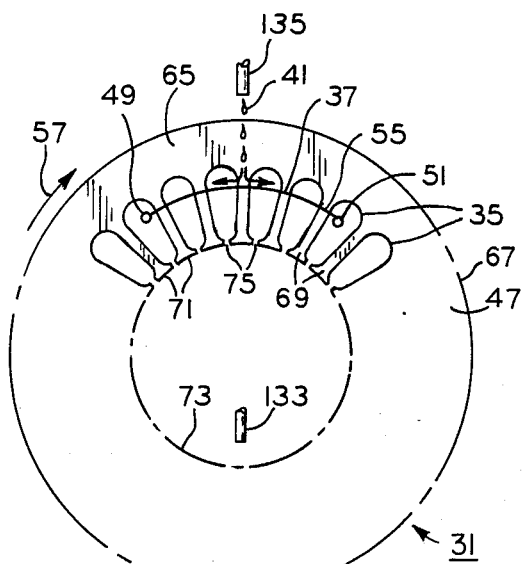
FIGS. 5, 6 and 7 are schematic end views of the loose wound core of FIG. 4 illustrating during one revolution thereof the flow of liquid adhesive material dispensed onto an opposite end turn portion of the coil of the winding means into slots of the loose wound core in which a pair of opposite side turn portions of the coil are received, respectively.

With nozzles 129–135 so located in their preselected protracted positions and with mandrel 101 and the assembly of sleeve 95 and loose wound core 31 mounted thereon being conjointly rotated in the clockwise direction of rotational arrow 57, liquid adhesive material 41 is fed or dripped from the nozzles at a preselected rate of flow onto opposite end turn portions 53, 55 of coils 37 on winding means 39 of loose wound core 31, as shown by a functional diagram box 141 in FIG. 9, and it is contemplated that the rate of flow from such nozzles may be respectively equal or different within the scope of the invention so as to meet at least some of the objects thereof. It is also contemplated that the rotation of mandrel 101 in the clockwise direction may be initiated subsequent to the location of nozzles 129–135 in their preselected positions, as indicated by the reversal arrows between boxes 137, 139 in the functional diagram of FIG. 9, within the scope of the invention so as to meet at least some of the objects thereof. In order to simplify and illustrate with clarity the following description of the flow of liquid adhesive material 41 dispensed onto opposite end turn portions 53, 55 of coils 37, only one opposite end turn portion 55 integral with opposite side turn portions 49, 51 of one of coils 37 is schematically shown on loose wound core 31 in association with nozzle 135 during one revolution of the loose wound core in FIGS. 5–7, respectively. For the sake of explanation, assume that a droplet of liquid adhesive material 41 is dispensed from nozzle 135 onto the generally arcuate midsection of opposite end turn portion 55 as it is rotated with loose wound core 31 in the clockwise direction of rotational arrow 57, as best seen in FIG. 5. Liquid adhesive material 41 applied from nozzle 135 onto the midsection of opposite end turn portion 55 would tend to flow by capillary action and gravity generally instantaneously in opposite directions (as shown by the flow arrows in FIG. 5) along the opposite end turn portion toward opposite side turn portions 49, 51 integrally formed therewith if the loose wound core was not being rotated in the clockwise direction. However, when loose wound core 31 is rotated from its position in FIG. 5 in the clockwise direction through a part of one revolution thereof to the position shown in FIG. 6 for example, it may be noted that in this rotational position of the loose wound core, opposite side turn portion 51 is disposed in a lower or "downhill" position with respect to the horizontal than opposite side turn portion 49 which is in effect "uphill" therefrom. Therefore, in response to the clockwise rotation of loose wound core 31 and since liquid adhesive material 41 dispensed onto opposite end turn portion 55 cannot flow therealong in an "uphill" direction, at least a greater amount of such liquid adhesive material flows or passes along the opposite end turn portion toward the lower or "downhill" opposite side turn portion 51 past opposite end face 47 of the loose wound core and into slot 35 thereof in which the "downhill" opposite side turn portion 51 is received. Since the aforementioned at least greater amount of liquid adhesive material 41 dispensed onto opposite end turn portion 55 is flowed into stator slot 35 in which "downhill" opposite side turn portion 51 is received, it may be noted that such slot may become generally filled with the liquid adhesive material flowed thereinto during the rotation of loose wound core 31 in the clockwise direction while only a lesser amount of the liquid adhesive material may be flowed into the slot 35 in which "uphill" opposite side turn portion 49 is received thereby to, in effect, starve the slot in which "uphill" opposite side turn portion 49 is received. When loose wound core 31 is rotated further through another part of one revolution thereof, as shown in FIG. 7 for instance, "uphill" opposite side turn portion 49 eventually attains a "downhill" position with respect to opposite end turn portion 51. However, since the aforementioned greater amount of liquid adhesive material 41 dispensed onto opposite end turn portion 55 has been flowed into the stator slot 35 in which "downhill" opposite side turn portion 51 is received, as discussed above, only a lesser amount, if any, of the liquid adhesive material remains available for flowing from the opposite end turn portion into the stator slot 35 in which "uphill" opposite side turn portion 49 is received even when "uphill" opposite side turn portion 49 is rotated into the "downhill" position with respect to "downhill" opposite side turn portion 51, as shown in FIG. 7. In view of the foregoing, it is believed that only slots 35 of loose wound core 31 in which "downhill" opposite side turn portions 51 of coils 37 are received become generally filled with liquid adhesive material 41 flowed thereinto during the rotation of the loose wound core in the clockwise direction of directional arrow 57 while the slots 35 in which "uphill" opposite side turn portions 49 of the coils are received are generally starved, i.e., only partially filled with the liquid adhesive material, as discussed above.

While the foregoing explanation of the flow of liquid adhesive material 41 applied to winding means 39 of loose wound core 23 is discussed in terms of only one conductor turn 86 of one of coils 37, it is, of course, apparent that such coils each have a plurality of opposite side turn portions 49, 51 within slots 35 of the loose wound core and associated with a plurality of opposite end turn portions 53, 55 in the annular groupings thereof adjacent opposite end faces 45, 47 of the loose wound core. Therefore, it may be noted that the flow of liquid adhesive material 41 discussed hereinabove with respect to only one opposite end turn portion 55 and opposite side turn portions 49, 51 connected therewith is applicable to generally all of such opposite end turn portions and side turn portions of winding means 39 when loose wound core 31 is rotated in the clockwise direction of rotational arrow 57. It may also be noted that liquid adhesive material 41 fed by nozzle 131 onto opposite end turn portions 53 of coils 37 flows therefrom generally along opposite side turn portions 49, 51 of the coils connected therewith to effect generally the filling of the same slots 35 of loose wound core 31 in which the "downhill" opposite side turn portions 51 of the coils are received while in effect starving the same slots in which the "uphill" opposite side turn portions 49 of the coils are received in the same manner as discussed hereinabove with respect to opposite end turn portions 55 of the coils. Since coils 37 of winding means 39 comprise a plurality of opposite side turn portions 49, 51 and opposite end turn portions 53, 55 as previously mentioned, interstices are, of course, defined therebetween, and it may be noted that such interstices between the "downhill" opposite side turn portions 51 of the coils are generally filled or saturated with liquid adhesive material 41 upon the filling therewith of slots 35 in loose wound core 31 in which the "downhill" opposite side turn portions 51 of the coils are received during the rotation of the stator in the clockwise direction of rotational arrow 57, as discussed hereinabove. Furthermore, it may also be noted that some of the liquid adhesive material dripped from nozzles 131, 135 onto opposite end turn portions 53, 55 of coils 37 in the annular groupings thereof remains in the interstices defined between the opposite end turn portions of the coils. Albeit not previously discussed, it may be noted that liquid adhesive material 41 dispensed by nozzles 129, 133 onto the inner circumferential surface or section of opposite end turn portions 53, 55 of coils 37 flows therefrom generally in the same manner as previously described with respect to the liquid resin material fed by nozzles 131, 135 onto the outer circumferential surface of the opposite end turn portions of the coils. During the rotation of loose wound core 31 in the clockwise direction of rotational arrow 57 and the counterclockwise direction of rotational arrow 59, as discussed in greater detail below, the rotational speed of the loose wound core may be preselected within a range of a maximum rotational speed or high value at which centrifugal displacement of liquid adhesive material 41 applied to winding means 39 of the loose wound core is generally obviated or at least minimized and a minimum rotational speed or low value great enough to generally prevent or at least minimize dripping from the winding means of the liquid adhesive material applied thereto. The flow of liquid adhesive material 41 dispensed onto opposite end turn portions 53, 55 of coils 37 therefrom along opposite side turn portions 49, 51 of the coils into slots 35 of loose wound core 31 in which the opposite side turn portions of the coils is received is illustrated by a functional diagram box 143 in FIG. 9.

Liquid adhesive material 41 flowed into slots 35 of loose wound core 31 is, of course, received within slot liners 77 and slot wedges 87 which are arranged in the slots generally in surrounding relation about opposite side turn portions 49, 51 of coils 37 received in the slots, as discussed hereinbefore. Some of this liquid adhesive material 41 so received within slot liners 77 and slot wedges 87 within slots 35 escapes therefrom by passing or seeping between opposite margins 91, 93 of the slot wedges and the confronting or overlaying portions of the slot liners so as to egress exteriorly thereof into the slots of loose wound core 31 into communication or contact with laminations 33 defining such slots, as illustrated by the flow arrows in FIG. 8. This seeping liquid adhesive material 41 is then at least in part passed or flowed from slots 35 generally by capillary action into wetting relation between at least a part of the interfacing surfaces of laminations 33 of loose wound core 31 while the assembly of sleeve 95 and the loose wound core is being rotated on mandrel 101 in the direction indicated by rotational arrow 57. During this wetting of laminations 33 by capillary action, as discussed above, liquid adhesive material 41 is believed to flow from slots 35 generally radially outwardly toward circumferential surface 67 of loose wound core 31 thereby to at least in part wet the laminations in yoke section 65 and between teeth 69 thereof. However, as previously mentioned, the aligning, engagement of sleeve 95 with tooth tips 71 of laminations 33 in loose wound core 31 maintains such tooth tips free of any of the seeping liquid adhesive material 41 flowing by capillary action from slots 35 into wetting relation between the laminations. While it is believed that this above discussed wetting of laminations 33 is effected in the main by capillary action, it is also believed that the rotation of loose wound core 31 in the direction of rotational arrow 57 at least assists in effecting the passage of liquid resin material 41 into the wetting relation thereof between the laminations. The above discussed wetting action of liquid adhesive material 41 between lamination 33 in the interfacing relation thereof is illustrated by a functional diagram box 145 in FIG. 9.

When a preselected amount of liquid adhesive material 41 has been applied onto winding means 39 from nozzles 129–135 in the manner discussed above, such application of the liquid adhesive material may, if necessary or if desired, be terminated for a preselected dwell or nonapplication period of time in order for the liquid adhesive material to pass from the interstices of opposite end turn portions 53, 55 of the winding means into slots 35 of loose wound core in which opposite side turn portions 49, 51 of the winding means are received, as discussed above. During this dwell period of time, it is, of course, desirable to maintain the rotation of the assembly of sleeve 95 and loose wound core 31 on mandrel 101 in the direction of rotational arrow 57 so as to prevent or at least minimize any loss of liquid adhesive material 41 therefrom, as previously mentioned. At the end of the aforementioned preselected dwell period, further dispensing of liquid adhesive material 41 from nozzles 129–135 onto winding means 39 may be resumed, if desired. Although only one dwell period is discussed herein between periods when liquid adhesive material 41 is dispensed onto winding means 39 of loose wound core 31 for purposes of disclosure, it is contemplated that such dwell period may be omitted or that more than one such dwell period may be utilized within the scope of the invention so as to meet at least some of the objects thereof.

When the assembly of sleeve 95 and loose wound core 31 on mandrel 101 have been conjointly rotated by endless chain drive 111 in the clockwise direction of rotational arrow 57 for a preselected period of time at least great enough to effect the filing of slots 35 in the loose wound core in which the "downhill" opposite side turn portions 51 of coils 37 are received as well as to at least in part wet the interfacing surfaces of laminations 33 in loose stack 43 thereof of the loose wound core, driving means 103 of apparatus 99 is operable to effect the indexing movement of the mandrel with such assembly thereon into the next successive or another indexed position thereof in dispensing station 127, as may be best seen in FIG. 15. Of course, prior to this indexing movement of mandrel 101, the dispensing of liquid adhesive material 41 from nozzles 129-135 is terminated, and such nozzles are retractively moved from the protracted or dispensing positions thereof toward their retracted positions (not shown) so as to accommodate the indexing movement of the mandrel at dispensing station 127 of apparatus 99. Upon this indexing movement by driving means 103 of mandrel 101 in dispensing station 127 of apparatus 99, sprocket 109 on the mandrel is disengaged from endless chain drive 111 thereby to terminate the clockwise rotation of the mandrel, as illustrated by a functional diagram box 147 in FIG. 9, and the sprocket is thereafter engaged with endless chain drive 113 thereby to establish the rotation of the mandrel in the counterclockwise direction of rotational arrow 59 at the dispensing station. This reversal of the rotation of mandrel 101 with the assembly of sleeve 95 and loose wound core 31 thereon at dispensing station 127 is illustrated by a functional diagram box 149 in FIG. 9. It is, of course, desirable to move mandrel 101 from the indexed position in which it is rotated in the direction of rotational arrow 57 into the subsequent indexed position in which the rotation of the mandrel is in the direction of rotational arrow 59 in order to obviate or at least minimize any loss of liquid adhesive material 41 from loose wound core 31 during such indexing movement.

Either before, after or generally simultaneously with the initiation of the reverse rotation of the assembly of sleeve 95 and loose wound core 31 on mandrel 101 in the counterclockwise direction of rotational arrow 59 at dispensing station 127 of apparatus 99, another set of means, such as nozzles 129a, 131a, 133a, 135a, may be protractively moved from retracted positions toward preselected protracted positions thereof by suitable conventional means (not shown) so as to be adjustably positioned or located adjacent opposite end turn portions 53, 55 of winding means 39 on the loose wound core. While nozzle 129a-135a are shown herein as being the same as nozzles 129a-135a for purposes of disclosure, it is contemplated that either more or fewer of such nozzles may be employed in the subsequent indexed position of mandrel 101 at dispensing station 127 and that such nozzles may be disposed either in the same preselected locations as discussed above with respect to winding means 39 of loose wound core 31 or in other different preselected locations within the scope of the invention so as to meet at least some of the objects thereof. The location of nozzles 129a-135a at dispensing station 127 is illustrated by a functional box diagram 151 in FIG. 9. Since it is contemplated that nozzles 129a-135a may be located with respect to loose wound core 31 prior to the initiation of the reverse rotation thereof, a reversing arrow is provided between functional diagram boxes 149, 151 in FIG. 9.

Figure 6:
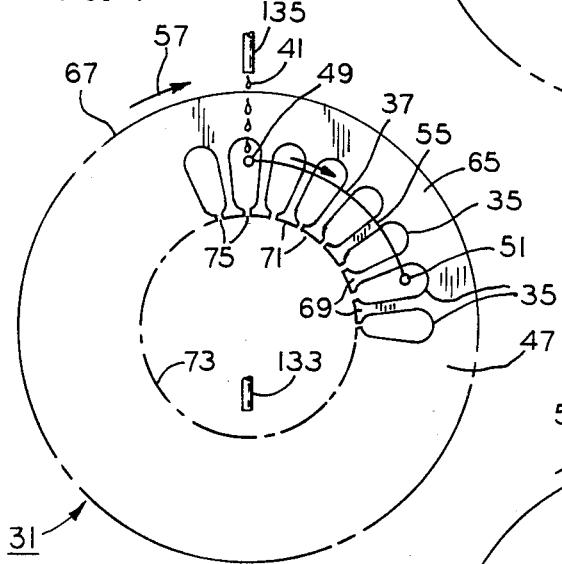

In response to this reverse or counterclockwise rotation of the assembly of sleeve 95 and loose wound core 31 on mandrel 101 at dispensing station 127 of apparatus 99, opposite side turn portions 49 of coils 37 now become the "downhill" opposite side turn portions with respect to liquid adhesive material 41 fed onto opposite end turn portions 53, 55 and flowed thereto with opposite side turn portions 51 now becoming the "uphill" opposite side turn portions, as best seen in FIGS. 5-7. During rotation of mandrel 101 in the counterclockwise direction of rotational arrow 59, liquid adhesive material 41 is fed by nozzles 129a, 133a and 131a, 135a onto opposite end turn portions 53, 55 of coils 37 as illustrated by a functional diagram box 153 in FIG. 9, and at least a greater amount of such fed liquid adhesive material flows from the opposite end turn portions along the "downhill" opposite side turn portions 49 of the coils so as to generally fill slots 35 of loose wound core 31 in which the "downhill" opposite side turn portions 49 are received while in effect starving the slots of the loose wound core in which the "uphill" opposite side turn portions 51 of the coils are received in the same manner as discussed hereinabove and as illustrated in a functional diagram box 155 in FIG. 9. It may be noted that slots 35 of loose wound core 31 in which "downhill" opposite side turn portions 49 of coils 37 are received so as to be generally filled with liquid adhesive material 41 during the counterclockwise rotation of the loose wound core are the same slots which were in effect starved of such liquid adhesive material during the previously discussed clockwise rotation of the loose wound core. Of course, the interstices between the "downhill" opposite side turn portions 41 of coils 37 become generally filled or saturated with the liquid adhesive material upon the filling therewith of slots 35 of loose wound core 31 in which the "downhill" opposite side turn portions 49 of the coils are received during the counterclockwise rotation of the loose wound core.

Further, during the above discussed dispensing of liquid adhesive material 41 onto opposite end turn portions 53, 55 of winding means 39 of loose wound core 31 as it is conjointly rotated in the counterclockwise direction with mandrel 101, some of this liquid adhesive material received within slot liners 77 and slot wedges 87 surrounding opposite side turn portions 49, 51 of the winding means within slots 35 escapes therefrom by passing or seeping between opposite margins 91, 93 of the slot wedges and the confronting overlaying portions of the slot liners so as to egress exteriorly thereof into the slots of the loose wound core into communication or contact with laminations 33 defining such slots, as previously mentioned and as best seen in FIG. 8. This seeping liquid adhesive material 41 is then at least in part passed or flowed from slots 35 generally by capillary action into wetting relation between the interfacing surfaces of laminations 33 of loose wound core 31 while the assembly of sleeve 95 and the loose wound core is being rotated on mandrel 101 in the direction indicated by rotational arrow 59. During this wetting of laminations 33 by capillary action, liquid adhesive material 41 is believed to flow from slots 35 generally radially outwardly toward circumferential surface 67 of loose wound core 31 thereby to at least in part wet the laminations in yoke section 65 and between teeth 69 thereof. While it is believed that this above discussed wetting of laminations 33 is effected in the main by capillary action, it is also believed that the rotation of loose wound core 31 in the direction of rotational arrow 59 at least assists in effecting the passage of liquid adhesive material 41 into the wetting relation thereof between the laminations. It is also believed that the wetting action of liquid adhesive material 41 with respect to laminations 33 in loose wound core 31 occasioned during the counterclockwise rotaion of the loose wound core is supplemental or additive to the wetting action of such laminations by the liquid adhesive material which is occasioned during the clockwise rotation of the loose wound core, as discussed hereinabove. The wetting action of liquid adhesive material 41 between laminations 33 in loose wound core 31 during the counterclockwise rotation thereof is illustrated by a functional diagram box 157 in FIG. 9.

Of course, during the above discussed counterclockwise rotation of loose wound core 31 at dispensing station 127 in apparatus 99, the application of liquid adhesive material 41 onto winding means 39 of the loose wound core from nozzles 129a–135a may, if desired or if necessary, be terminated for a preselected dwell or nonapplication period of time and then resumed in order for the liquid adhesive material to pass from the interstices of opposite end turn portions 53, 55 of the winding means into slots 35 of the loose wound core in which opposite side turn portions 49, 51 of the winding means are received, as discussed in detail hereinbefore with respect to the clockwise rotation of the loose wound core at the dispensing station of the apparatus. During this dwell period of time, it is desirable to maintain the rotation of loose wound core 31 in the direction of rotational arrow 59, and although only one dwell period is discussed herein between periods when liquid adhesive material 41 is dispensed onto winding means 39 of the loose wound core during the counterclockwise rotation thereof, it is contemplated that such dwell period may be omitted or that more than one such dwell period may be utilized within the scope of the invention so as to meet at least some of the objects thereof.

Liquid adhesive material 41 may be continued to be dispensed onto the opposite end turn portions 53, 55 of coils 37 for a preselected period of time during the counterclockwise rotation of loose wound core 31 to generally fill or saturate the interstices between the opposite end turn portions of the coils, and when a preselected amount of such liquid adhesive material has been applied to winding means 39 of loose wound core 31 during both the clockwise and counterclockwise rotations of the stator, the dispensing of the liquid adhesive material may be terminated. In view of the foregoing, it may be noted that the feeding of liquid adhesive material 41 from nozzles 129–135 and 129a–135a onto opposite end turns 53, 55 of coils 37 during the rotation of loose wound core in the clockwise and counterclockwise rotation thereof generally ensures not only the equalization of fill of all of slots 35 of the loose wound core with the liquid adhesive material but also the generally complete fill thereof as well as the encapsulation or saturation of the opposite end turn portions and opposite side turn portions 49, 51 of winding means 39 with the liquid adhesive material. Also it may be noted that during the rotation of the assembly of sleeve 95 and loose wound core 31 on mandrel 101 in both the opposite directions of rotational arrows 57, 59 at dispensing station 127 of apparatus 99, liquid adhesive material 41 is passed from within slot liners 77 and slot wedges 87 into slots 35 defined by laminations 35 of the loose wound core and therefrom generally by capillary action into wetting relation between the laminations. Further, it may also be noted that since the liquid adhesive material 41 is applied onto opposite end turn portions 53, 55 of winding means 39 flowing therefrom along opposite side turn portions 49, 51 into slots 35 of loose wound core 31 in which the opposite side turn portions are received, opposite end faces 45, 47 on lamination stack 43 of the loose wound core remain at least generally free of such liquid adhesive material. Additionally, since only a preselected volume of liquid adhesive material 41 is distributed throughout loose wound core 31, as previously mentioned, it may also be noted that circumferential surface 67 on lamination stack 43 of the loose wound core remains at least generally free of the liquid adhesive material upon the wetting of the interfacing surfaces of laminations 41 in such stack.

When winding means 39 and lamination stack 43 are saturated with liquid adhesive material 41 applied thereto in the manner discussed hereinabove, driving means 103 is operable in the timed periodic basis thereof to effect the indexing movement of mandrel 101 with sleeve 95 and loose wound core 31 mounted thereto from dispensing station 127 of apparatus 99 through a plurality of preselected indexed positions at a gelling station or chamber 159 of the apparatus, as best seen in FIGS. 14 and 15. At gelling station 159, another set of heating devices, such as electrical or infrared heating elements 161 or the like for instance, are arranged for heat transfer relation with the assembly of sleeve 95 and loose wound core 31 mounted onto mandrel 101 as it is moved through the preselected indexed positions thereof in the gelling station. A preselected temperature or temperature range attained in gelling station 159 in response to the operation of heating devices 161 therein is, of course, at least great enough to effect the gelling in place of liquid adhesive material 41 contained within winding means 39 and loose lamination stack 43 of loose wound core 31. During this gelling of liquid adhesive material 41 contained in loose wound core 31, at least some of the solvent, in which the resin particulate matter of the liquid adhesive material is mixed, is driven off or evaporated thereby to gell the liquid adhesive material. During the passage through gelling station 159 of mandrel 101 with sleeve 95 and loose wound core 31 mounted thereto, sprocket 109 of the mandrel is selectively engaged with endless chain drives 115, 117 provided at the preselected indexed positions of the mandrel in the gelling station thereby to selectively effect clockwise and counterclockwise rotation of the mandrel at the preselected indexed positions thereof in order to obviate or at least minimize any loss of liquid adhesive material 41 from the loose wound core. While only two preselected indexed positions of mandrel 101 are illustrated herein in gelling station 159 for purposes of drawing simplicity, it is contemplated that any number of such preselected indexed positions may be utilized in the gelling station at least great enough to provide a time period satisfactory to effect the gelling of liquid adhesive material 41 contained in loose wound core 31 at least at the preselected temperature attained by heating devices 161 within the scope of the invention so as to meet at least some of the objects thereof. Further, it is also contemplated that any number of endless chain drives may be utilized to effect the rotation in opposite directions of mandrel 101 when disposed in its various preselected indexed positions in gelling station 159 or that only one chain drive may be utilized to effect the rotation in only one direction of the mandrel during the passage through the various preselected indexed positions thereof in the gelling station within the scope of the invention so as to meet at least some of the objects thereof. The gelling of liquid adhesive material 41 in place in loose wound core 31 upon the passage thereof through gelling station 159 of apparatus 99 is illustrated by a functional diagram box 163 in FIG. 9.

Upon the gelling of liquid adhesive material 41 in loose wound core 31 in the manner discussed hereinabove, driving means 103 is operable in the timed periodic basis thereof to effect the indexing movement of mandrel 101 with sleeve 95 and loose wound core 31 mounted thereon from gelling station 159 of apparatus 99 through a plurality of preselected indexed positions at a curing station or chamber 165 of the apparatus, as best seen in FIGS. 14 and 15. At curing station 165, another set of heating devices, such as electrical or infrared heating elements 167 or the like for instance, are arranged for heat transfer relation with the assembly of sleeve 95 and loose wound core 31 mounted to mandrel 101 as it is moved through the preselected indexed positions thereof in the curing station. A preselected temperature or temperature range attained in curing station 165 in response to the operation of heating devices 167 therein is, of course, at least great enough to effect the hardening in place of the gelled liquid adhesive material 41 contained within winding means 39 and loose lamination stack 43 of loose wound core 31, and it is contemplated that the number of preselected indexed positions through which mandrel 101 is moved in curing station will provide a time period great enough to effect satisfactory hardening of the liquid adhesive material at least at the preselected temperature attained in curing station 165. During this curing or hardening of liquid adhesive material 41 contained in loose wound core 31, any solvent remaining in the liquid adhesive material is, of course, driven off or evaporated. As previously mentioned, it is believed that the relation of loose wound core 31 in the opposite directions at least when liquid adhesive material 41 is dispensed thereto effects a more uniform distribution of such liquid adhesive material throughout the loose wound core while also permitting the application to such loose wound core of the necessary preselected amounts or volume of the liquid adhesive material to ensure such more uniform distribution thereof. Thus, during the passage of mandrel 101 through the preselected indexed positions thereof in curing station 165, it is believed that a more uniform and stronger bond is effected between opposite side turn portions 49, 51 and opposite end turn portions 53, 55 of winding means 39 due to improved webbing or filleting of liquid adhesive material 41 within the interstices between the opposite end turn portions and the opposite side turn portions of the winding means 39 thereby to achieve such more uniform and stronger bond. For instance and as previously mentioned, when liquid adhesive material 41 is in its fluid or liquid state, the liquid resin material generally fills all slots 35 in loose wound core 31 in response to the clockwise and counterclockwise rotation of the loose wound core thereby to effect the generally complete encapsulation and saturation by the liquid adhesive material of opposite side turn portions 49, 51 and opposite end turn portions 53, 55 of winding means 39 as well as the generally complete fill of the interstices thereof. Thus, when liquid adhesive material 41 is cured, it webs or fillets generally completely within the interstices of winding means 39 which is believed to strengthen the winding means against movement when electrically energized thereby to effectively reduce shorting of the winding means as may be occasioned by abrasive rubbing together of opposite end turn portions and opposite side turn portions of the winding means in response to such electrical energization. Since liquid adhesive material 41 generally completely fills slots 35 of loose wound core 31 both within slot liners 77 and slot wedges 87 disposed therein and without such slot liners in the slots, as discussed hereinabove, it may be noted that upon the curing of the liquid adhesive material, such slot liners and slot wedges are generally bonded in place against movement within the slots by the hardened liquid adhesive material. Further, since liquid adhesive material 41 is believed to be wetted generally completely between laminations 33 of loose stack 43 thereof in loose wound core 31, it may also be noted that upon the curing of the liquid adhesive material, the laminations are bonded together in their interfacing relation by the hardened liquid adhesive material therebetween so as to retain the laminations against displacement which maintains the axial alignment of bore 73 through the loose wound core. Thus, the curing of liquid adhesive material 41 in loose wound core 31 serves to bond the components thereof together in a generally unitary mass with the opposite end faces 45, 47 and circumferential surface 67 on lamination stack 43 of the loose wound core being at least generally free of the liquid adhesive material, as previously mentioned, and the curing of the liquid adhesive material to effect the hardening thereof as the loose wound core passes through curing station 165 of apparatus 99 is illustrated by a functional diagram box 169 in FIG. 9.

When liquid adhesive material 41 is hardened so as to effect the bonding together into the generally unitary mass of the components of loose wound core 31 as discussed above, driving means 103 is operative in the timed periodic basis thereof to move mandrel 101 with sleeve 95 and the loose wound core mounted thereon from curing station 165 through a plurality of indexed positions in a cooling station or chamber 171 in apparatus 99. During the passage of the now bonded together loose wound core 31 through cooling station 171, the temperature of the assembly of sleeve 95 and the loose wound core is, of course, reduced in order to facilitate handling and unloading by an operator of such assembly from mandrel 101 when it is returned from the cooling station to the loading and unloading station 105 of apparatus 99. As previously mentioned, it is contemplated that suitable conventional equipment may be utilized to effect the loading and unloading of the assembly of sleeve 95 and loose wound core 31 with respect to mandrel 101 at loading and unloading station 105 of apparatus 99. The cooling of the assembly of sleeve 95 and loose wound core 31 upon the passage thereof through cooling station 171 of apparatus 99 is illustrated by a functional diagram box 173 in FIG. 9, and the unloading of such assembly from mandrel 101 at loading and unloading station 105 is illustrated by a functional diagram box 175 in FIG. 9. Albeit not shown for purposes of drawing simplicity, it is contemplated that suitable conventional means may be associated with cooling station 171 of apparatus 99 for injecting cooling air thereinto so as to enhance the cooling of the assembly of sleeve 95 and loose wound core 31 mounted on mandrel 101 upon the passage thereof through the cooling station. Of course, sleeve 95 may be removed from bore 73 of the now bonded together loose wound core 31 after the unloading thereof at loading and unloading station 105 of apparatus 99, and such removal of the sleeve is illustrated in a functional diagram box 177 in FIG. 9.

With reference again to the drawings in general and in the light of the foregoing, there is illustrated in one form of the invention a method of operating apparatus 99 for bonding loose wound core 31 with liquid adhesive material 41 into a generally unitary mass (FIGS. 1 and 14-15). Apparatus 99 has at least work stations 119, 127, 165 and a pair of sets of means, such as nozzles 129-135 and 129a-135a for instance, operable generally for dispensing liquid adhesive material (FIGS. 14 and 15). Loose wound core 31 comprises laminations 33 respectively arranged generally in interfacing relation in stack 43 thereof with the lamination stack having opposite end faces 45, 47, and slot means 35 extend generally axially through the lamination stack between the opposite end faces thereof for receiving winding means 39 of the loose wound core, respectively (FIGS. 1-4). Winding means 39 include coils 37 having at least one conductor turn 86 with opposite side turn portions 49, 51 of the coils received in slot means 35 of lamination stack 43 and with opposite end turn portions 53, 55 of the coils arranged generally in annular groupings thereof adjacent opposite end faces 45, 47 of the lamination stack, respectively (FIGS. 2 and 4). In practicing this method, loose wound core 31 is progressively moved between a plurality of preselected indexed positions through at least work stations 119, 127, 165 of apparatus 99, and the loose wound core is preheated upon the movement thereof through work station 119 of the apparatus (FIGS. 14 and 15). Loose wound core 31 is rotated in one direction in at least one of the preselected indexed positions thereof and in another direction opposite the one direction in at least another of the preselected indexed positions thereof upon the movement of the loose wound core through work station 127 of apparatus 99, and dispensing means or nozzles 129-135 and 129a-135a are operated at work station 127 to dispense liquid adhesive material 41 onto opposite end turns 53, 55 of coils 37 of the loose wound core during at least a part of the rotation of the loose wound core in the one and another directions in the at least one and another preselected indexed positions thereof at the another work station of the apparatus, respectively (FIG. 15). Liquid adhesive material 41 is flowed from opposite end turns 53, 55 of coils 37 generally along opposite side turn portions 49, 51 of the coils into slot means 35 of loose wound core 31 in which the opposite side turn portions of the coils are received, and some of the liquid adhesive material is passed from the slot means by capillary action into wetting relation between laminations 33 in the interfacing relation thereof in the loose wound core in response to the rotation of the loose wound core in the one and another directions in the at least one and another preselected indexed positions thereof at work station 121 of apparatus 99, respectively (FIGS. 5-8 and 15). Loose wound core 31 is further heated upon its movement through at least another one of the work stations, such as curing station 165 for instance, of apparatus 99, and liquid adhesive material 41 in the loose wound core is thereby cured to effect the hardening of the liquid adhesive material so as to bond winding means 39 and laminations 33 of the loose wound core into the generally unitary mass thereof (FIG. 15).

Further in the light of the foregoing, there is also illustrated another method in one form of the invention for treating loose wound core 31 with liquid adhesive material 41 adapted for bonding the loose wound core (FIGS. 1 and 5-8). Loose wound core 31 comprises laminations 33 arranged in interfacing relation with each other in loose stack 43 thereof, end faces 45, 47 and circumferential surface 67 on the stack, and slot means 35 interposed between the opposite end faces for receiving winding means 39 of the loose wound core (FIG. 2). Winding means 39 include a plurality of sets of coils 37, each coil having at least one conductor turn 86 with opposite side turn portions 49, 51 of the coils received in slot means 35 and with opposite end turn portions 53, 55 of the coils arranged generally adjacent opposite end faces 45, 47 of lamination stack 43, respectively (FIGS. 2 and 4). In practicing this method, loose wound core 31 is rotated in one direction and another direction opposite thereto, and liquid adhesive material 41 is dispensed onto opposite end turn portions 53, 55 of the coils 37 during the rotation of the loose wound core in the one and other directions (FIGS. 5-7). Liquid adhesive material 41 is flowed from opposite end turn portions 53, 55 of coils 37 generally along opposite side turn portions 49, 51 of the coils into slot means 35 of lamination stack 43 in which the opposite side turn portions of the coils are received, and some of the liquid adhesive material is passed from the slot means generally by capillary action into wetting relation between laminations 33 in the interfacing relation thereof in the lamination stack and at least generally toward circumferential surface of the lamination stack in response to the rotation of the loose wound core in the one and another directions, respectively (FIGS. 5-8).

Figure 16:
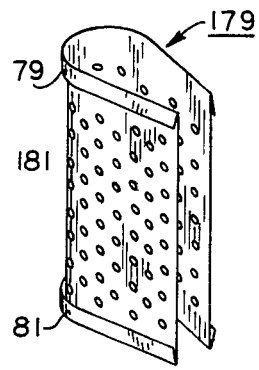
FIG. 16 is an isometric view of another slot liner which may be utilized in the loose wound core.
Figure 17:
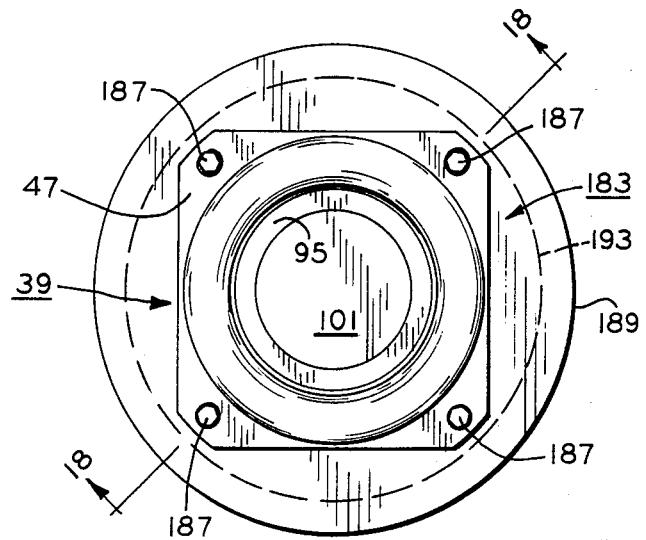
FIG. 17 is an end view of an assembly of the aligning sleeve and an alternative loose wound core associated with a bolt-down fixture and mounted to the rotatable mandrel of the apparatus of FIGS. 14 and 15.

With reference to FIG. 16, an alternative slot liner 179 is shown having generally the same structural features and adapted for use in loose wound core 31 generally in the same manner as the previously discussed slot liner 77 with the exceptions discussed hereinafter within the scope of the invention so as to meet at least some of the objects thereof.

Slot liners 179 has a plurality of openings 181 extending therethrough, and the slot liners are disposed in slots 35 of loose wound core 31 so as to extend generally about opposite side turn portions 49, 51 of coils 37 in winding means 39 received in the slots. When liquid adhesive material 41 is dispensed onto winding means 39 of loose wound core 31 so as to be flowed along opposite end turn portions 53, 55 and opposite side turn portions 49, 51 of the winding means into slots 35 of the loose wound core, as previously discussed, openings 181 in slot liners 179 disposed within the slots facilitate the flow of the liquid adhesive material therefrom into direct contact or communication with laminations 33 defining the slots exteriorly of the slot liners therein.

With reference to FIGS. 17-20, an alternative method is disclosed for fabricating a loose wound core or stator 183 with such alternative method having generally the same method steps and utilizing generally the same components as were employed in the above discussed method of fabricating loose wound core 31 with the exceptions discussed hereinafter. Further, while this alternative method of fabricating loose wound core 183 meets at least some of the objects set out hereinbefore, it is believed that such alternative method may have indigenous objects and advantageous features as will be in part apparent and in part pointed out hereinafter.

In the fabrication of loose wound core 183, laminations 33 are stacked to a preselected height in loose stack 43 thereof and properly aligned to define or form a plurality of means, such as axially extending openings or passageways 185 or the like for instance, for receiving a plurality of through-bolts 187 and to axially align slots 35 and bore 73 between opposite end faces 45, 47 of the loose lamination stack. During this alignment of loose lamination stack 43, opposite end face 45 thereof rests on a generally flat ring 189 having a plurality of threaded openings 191 therein for association with through-bolts 187, and the ring has a circumferential flange 193 which abuts or is seated against a base 195 of an alignment arbor 197. Alignment arbor 197 extends generally perpendicularly from base 195 thereof and includes alignment lands and grooves 199 which receive slot entrances 75 and tooth tips 71 of laminations 33 in stack 43 thereof on the arbor thereby to effect the alignment through the loose lamination stack of slots 35, bore 73 and openings 185. Throughbolts 187 are inserted through openings 185 provided therefor in loose lamination stack 43 into threaded engagement with threaded openings 191 in ring 189, and the through-bolts are torqued to bolt down the loose lamination stack in the aligned relation thereof against the ring with the same approximate bolt-down force as will be experienced by the loose wound core when it is finally mounted within a motor-compressor unit (not shown), as is well known in the art. In this manner, laminations 33 in the vicinity generally about each opening 185 will have surface-to-surface contact thereby to define a plurality of compression regions 201 extending generally axially between opposite end faces 45, 47 of lamination stack 43.

Figure 20:
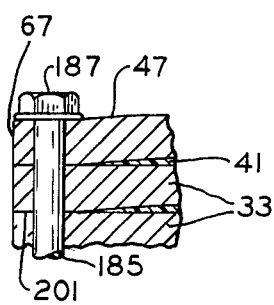
FIG. 20 is an enlarged partial view taken from FIG. 18 showing the compression zones in the lamination stack of the alternative loose wound core formed by the bolting down of such lamination stack to the fixture therefor.
Figure 18:
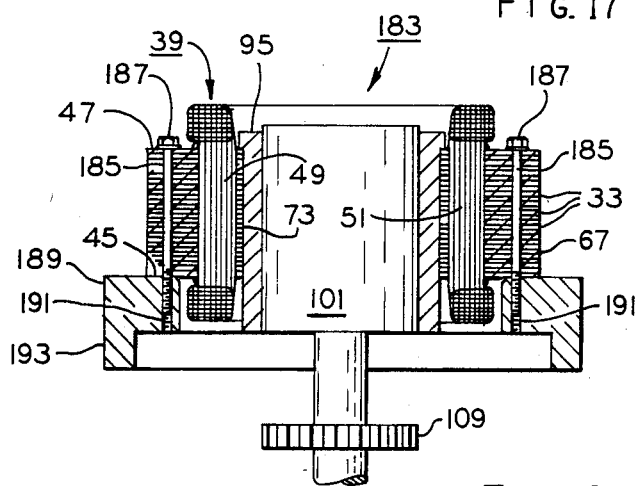
FIG. 18 is a sectional view taken along line 18—18 of FIG. 17.
Figure 19:
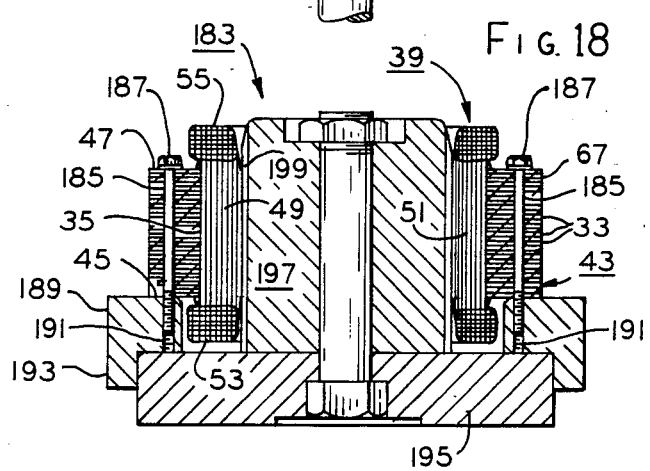
FIG. 19 is a sectional view of the loose lamination stack of the alternative loose wound core of FIGS. 17 and 18 illustrating the bolting down of such lamination stack to the bolt-down fixture on an alignment arbor.

With lamination stack 43 so mounted to ring 189, winding means 39, slot liners 77 and slot wedges 87 may be associated with slots 35 of the lamination stack in the same manner as previously discussed thereby to comprise loose wound core 183. Thereafter, sleeve 95 may be inserted into bore 73 of loose wound core 183 and the assembly of the sleeve and the loose wound core mounted onto ring 189 may be associated with mandrel 101 at loading and unloading station 105 of apparatus 99 for the indexing passage therethrough in the same manner as previously described. Of course, during the passage of the assembly of sleeve 95, loose wound core 183 on ring 189 through preheating station 119, the sleeve is expanded into engagement with tooth tips 71 of laminations 33 of the loose wound core in response to the heat transferred thereto by heating devices 121 at the preheating station; however, since the loose wound core is bolted down by through-bolts 187 to ring 189 thereby to maintain the alignment of bore 73 through the loose wound core, it is believed that the expansion of the sleeve into engagement with the bore may or may not have aligning effect thereon. Nevertheless, the engagement of sleeve 95 with tooth tips 71 of loose wound core 183 does serve to maintain such tooth tips free of any liquid adhesive material 41 which is flowed by capillary action from slots 35 of the loose wound core into wetting relation between laminations 33 of the loose wound core when such liquid adhesive material is dispensed onto winding means 39 thereof at dispensing station 127 of apparatus 99, as previously described. Further, it may also be noted that a greater amount of liquid adhesive material 41 is received in the wetting relation thereof between laminations 33 in the interfacing relation thereof in loose wound core 33 exteriorly of compression regions 201 than interiorly thereof when the liquid adhesive material is dispensed onto winding means 39 of the loose wound core at dispensing station 127 of the apparatus, as best seen in FIG. 20. If a more detailed description of the bolt-down association of loose wound core 183 with ring 189 on alignment arbor 197 and the exclusion of liquid adhesive material 41 from compression regions 201 of the loose wound core is desired, reference may be had to the aforementioned U.S. Pat. No. Re. 26,788 issued Feb. 10, 1970 to Bobbie B. Hull.

From the foregoing, it is apparent that a novel method of treating a loose wound core, a novel method of fabricating a loose wound core and a novel method of operating apparatus for bonding a loose wound core have been presented meeting the objects set out hereinbefore, as well as others, and it is contemplated that changes as to the precise arrangement, shapes, details and connections of the components associated with such methods, as well as the precise order of the steps of such methods, may be made by those having ordinary skill in the art without departing from the spirit of the invention or scope thereof as defined by the claims which follow.

What we claim as new and desire to secure by Letters Patent of the United States is:

1. A method of treating a loose wound core with a hardenable liquid adhesive material adapted for bonding the loose wound core into a generally unitary mass, the loose wound core including a lamination stack having a plurality of interfacing lamination surfaces defined between a pair of opposite end faces on the lamination stack, a bore extending through the lamination stack and intersecting with the opposite end faces thereof, and a plurality of slot means intersecting with the bore, the interfacing lamination surfaces and the opposite end faces of the lamination stack for receiving winding means of the loose wound core, respectively, the winding means having a plurality of sets of coils, and each coil having at least one conductor turn with opposite side turn portions of the coils received in the slot means and with opposite end turn portions of the coils arranged in generally annular groupings about the bore adjacent the opposite end faces, respectively, the method comprising the steps of:

preheating the loose wound core to at least a preselected temperature;

rotating the loose wound core in one direction at a speed generally between a preselected low value and a preselected high value;

feeding the liquid adhesive material onto the opposite end turn portions of the coils generally at a preselected rate of flow to at least minimize dripping of the liquid adhesive material from the opposite end turn portions of the coil when the rotational speed of the loose wound core is generally about the preselected low value thereof and to at least minimize centrifugal displacement of the liquid adhesive material from the opposite end turn portions of the coil when the rotational speed of the loose core is generally about the preselected high value thereof;

retaining in the opposite end turn portions of the coils a part of the liquid adhesive material fed thereto during the feeding step and flowing another part of the liquid adhesive material from the opposite end turn portions of the coils generally along the opposite side turn portions of the coils into the slot means of the lamination stack in which the opposite side turn portions of the coils are received thereby to at least in part fill the slot means in which some of the opposite side turn portions of the coils are received with the liquid adhesive material fed thereinto while at least generally impeding the fill of the slot means of the lamination stack in which the other of the opposite side turn portions of the coils are received with the liquid adhesive material when the loose wound core is being rotated in the one direction;

passing some of the liquid adhesive material flowed into the slot means therefrom generally by capillary action into wetting relation between at least some of the interfacing lamination surfaces in the lamination stack;

interrupting the feeding of the liquid adhesive material onto the opposite end turn portions of the coils at least when a preselected volume of the liquid adhesive material has been fed thereto during the rotation of the loose wound core in the one direction;

terminating the rotation of the loose wound core in the one direction;

reestablishing the rotation of the loose wound core in another direction opposite the one direction at a speed generally between the preselected low and high values thereof;

repeating the feeding step while the core is being rotated in the another direction;

flowing the liquid adhesive material from the opposite end turn portions of the coils generally along the opposite side turn portions of the coils into the slot means of the lamination stack in which the side turn portions of the coils are received and filling at least in part the slot means in which the other opposite side turn portions of the coils are received with the liquid adhesive material fed thereinto while at least generally impeding the liquid adhesive material fill of the slot means of the lamination stack in which the some opposite side turn portions of the coils are received when the loose wound core is being rotated in the another direction thereby to generally equalize the liquid adhesive material fill of the slot means of the lamination stack;

repeating the passing step;

ceasing the feeding of the liquid adhesive material onto the opposite end turn portions of the coils at least when anothter preselected volume of the liquid adhesive material has been fed thereto during the rotation of the loose wound core in the another direction with the another preselected volume of the liquid adhesive material supplementing the first named preselected volume of the liquid adhesive material fed onto the opposite end turn portions of the coils during the rotation of the loose wound core in the one direction so as to at least generally saturate the winding means with the liquid adhesive material; and heating further at least the loose wound core to effect the hardening of the liquid adhesive material contained in the winding means and the lamination stack thereby to effect the bonding of the loose wound core into the generally unitary mass.

2. A method of treating a loose wound core for a dynamoelectric machine with a hardenable liquid adhesive material adapted for bonding the loose wound core, the loose wound core including a lamination stack having a plurality of interfacing lamination surfaces defined between a pair of opposite end faces on the lamination stack, a plurality of slot means in the lamination stack intersecting with the opposite end faces for receiving winding means of the loose wound core, the winding means having a plurality of sets of coils, and each coil having at least one conductor turn with opposite side turn portions of the coils received in the slot means and with opposite end turn portions of the coils arranged generally adjacent the opposite end faces, respectively, the method comprising the steps of:

rotating the loose wound core in one direction;

dispensing the liquid adhesive material onto the opposite end turn portions of the coils at least when the loose wound core is being rotated in the one direction and flowing a greater amount of the liquid adhesive material from the opposite end turn portions of the coils generally along some of the opposite side turn portions of the coils into the slot means of the lamination stack in which the some opposite side turn portions of the coils are received than is flowed from the opposite side turn portions of the coils generally along the other of the opposite side turn portions of the coils into the slot means of the lamination stack in which the other opposite side turn portions are received in response to the rotation of the loose wound core in the one direction;

passing some of the liquid adhesive material flowed into the slot means of the lamination stack during the rotation of the loose wound core in the one direction from the slot means generally by capillary action into wetting relation between at least some of the interfacing lamination surfaces in the lamination stack;

reversing the rotation of the loose wound core to effect the rotation thereof in another direction opposite the one direction;

continuing the dispensing of the liquid adhesive material onto the opposite end turn portions of the coils at least when the loose wound core is being rotated in the another direction and flowing a greater amount of the liquid adhesive material from the opposite end turn portions of the coils generally along the other opposite side turn portions of the coils into the slot means of the lamination stack in which the other opposite side turn portions of the coils are received than is flowed from the opposite end turn portions of the coils generally along the some opposite side turn portions of the coils into the slot means of the lamination stack in which the some opposite side turn portions of the coils are received in response to the rotation of the loose wound core in the another direction thereby to generally equalize the liquid adhesive material fill of the slot means in the lamination stack; and flowing some of the liquid adhesive material flowed into the slot means of the lamination stack during the rotation of the loose wound core in the another direction from the slot means generally by capillary action into wetting relation between the at least some interfacing lamination surfaces in the lamination stack.

3. The method as set forth in claim 2 comprising the preliminary step of establishing a plurality of compression regions extending generally axially between the opposite end faces of the lamination stack whereby a greater amount of the liquid adhesive material is received in the wetting relation thereof between the at least some interfacing lamination surfaces in the lamination stack exteriorly of the compression regions than interiorly thereof.

4. The method as set forth in claim 2 comprising the additional step of terminating the dispensing of the liquid adhesive material at least generally as the opposite end turn portions of the coils become saturated with the liquid adhesive material.

5. The method as set forth in claim 2 wherein the loose wound core further includes a bore in the lamination stack communicating with the slot means and the opposite end faces thereof, means at least in part within the slot means for insulating between the opposite side turn portions of the coils and the lamination stack, and a plurality of means associated at least in part in overlaying engagement with the insulating means and the lamination stack for retaining the opposite side turn portions of the coils against displacement from the slot means into the bore, respectively, and wherein the passing step and the flowing step each include seeping the liquid adhesive material between at least some of the overlays of the insulating means and the retaining means in at least some of the slot means with the seeping liquid adhesive material effecting the wetting relation thereof between the at least some interfacing lamination surfaces in the lamination stack, respectively.

6. A method of treating a loose wound core for a dynamoelectric machine with a hardenable liquid adhesive material adapted for bonding the loose wound core, the loose wound core including a loose lamination stack having a plurality of interfacing lamination surfaces defined between a pair of opposite end faces on the loose lamination stack, a circumferential surface on the loose lamination stack between the opposite end faces thereof, a plurality of slot means extending through the loose lamination stack between the opposite end faces thereof for receiving winding means of the loose wound core, the winding means having a plurality of coils, and each coil having at least one conductor turn with opposite side turn portions of the coils received in the slot means and with opposite end turn portions of the coils arranged generally adjacent the opposite end faces, respectively, the method comprising the steps of:

rotating the loose wound core in one direction and another direction opposite thereto and dispensing the liquid adhesive material onto the opposite end turn portions of the coils during at least a part of the rotation of the loose wound core in the one and another directions, respectively; and flowing the liquid adhesive material from the opposite end turn portions of the coils generally along the opposite side turn portions of the coils into the slot means of the lamination stack in which the opposite side turn portions of the coils are received and passing some of the liquid adhesive material from the slot means generally by capillary action into wetting relation between at least some of the interfacing lamination surfaces in the loose lamination stack and at least generally toward the circumferential surface of the loose lamination stack in response to the rotation of the loose wound core in the one and another directions, respectively.

7. The method as set forth in claim 6 wherein the flowing and passing step includes equalizing at least generally the liquid adhesive material fill of the slot means in response to the liquid adhesive material flowed thereinto during the rotation in the one and another directions of the loose wound core, respectively.

8. The method as set forth in claim 6 wherein the flowing and passing step includes containing in the opposite end turn portions of the coils a part of the liquid adhesive material dispensed thereonto and at least generally saturating thereby the opposite end turn portions of the coils, respectively.

9. The method as set forth in claim 6 wherein the flowing and passing step includes causing a greater amount of the liquid adhesive material to flow from the opposite end turn portions of the coils along some of the opposite side turn portions of the coils into the slot means in which the some opposite side turn portions of the coils are received than is flowed along some other of the opposite side turn portions of the coils into the slot means in which the some other opposite side turns of the coils are received when the loose wound core is rotated in one of the one and another directions, respectively.

10. The method as set forth in claim 9 wherein the flowing and passing step further includes causing a greater amount of the liquid adhesive material to be passed from the opposite end turn portions of the coils along the some other opposite side portions of the coils into the slot means in which the some other opposite side turn portions of the coils are received than is passed along the some opposite side turn portions of the coils into the slot means in which the some opposite side turn portions of the coils are received when the loose wound core is rotated in the other of the one and another directions, respectively.

11. The method as set forth in claim 6 comprising the preliminary step of establishing a plurality of compression regions extending generally axially across the loose lamination stack between the opposite end faces thereof and at least generally adjacent the circumferential surface thereof.

12. The method as set forth in claim 4 wherein the flowing and passing step includes accumulating more of the liquid adhesive material between the at least some interfacing lamination surfaces of the loose lamination stack exteriorly of the compression regions of the loose lamination stack than interiorly of the compression regions, respectively.

13. The method as set forth in claim 6 comprising the preliminary step of heating the loose wound core to at least a preselected temperature.

14. The method as set forth in claim 6 comprising the additional step of heating the loose wound core to harden the liquid adhesive material contained in the loose wound core thereby to effect the bonding together of the loose lamination stack and the winding means thereof.

15. The method as set forth in claim 14 comprising the further additional step of cooling the loose wound core.

16. The method as set forth in claim 6 wherein the loose wound core further includes a plurality of means disposed at least in part within the slot means for electrically insulating the opposite side turn portions of the coils received in the slot means from the loose lamination stack, and a plurality of means engaged at least in part with the electrically insulating means and the loose lamination stack for retaining the opposite side turn portions of the coils against displacement from the slot means, respectively, and wherein the flowing and passing step includes seeping some of the liquid adhesive material between at least some of the insulating means and the retaining means into at least some of the slot means exteriorly of the electrically insulating means therein to effect the wetting relation of the liquid adhesive material between the at least some interfacing lamination surfaces in the lamination stack.

17. The method as set forth in claim 6 wherein the loose wound core further includes a plurality of means disposed within the slot means so as to extend at least in part about the opposite side turn portions of the coils received within the slot means for electrically insulating at least a part of the opposite side turn portions of the coils from the loose lamination stack and with the electrically insulating means having a plurality of passages therethrough, and wherein the flowing and passing step includes flowing the liquid adhesive material from within the electrically insulating means through at least some of the passages thereof into the slot means exteriorly of the electrically insulating means so as to effect the wetting generally by capillary action of the liquid adhesive material between the at least some interfacing lamination surfaces in the loose lamination stack.

18. A method of fabricating a loose wound core for a dynamoelectric machine, the loose wound core including a plurality of slot liners, a plurality of slot wedges, a plurality of coils, each coil having at least one conductor turn with opposite side turn portions and opposite end turn portions, a hardenable liquid adhesive material adapted for bonding the loose wound core, and a plurality of laminations each having a circumferential edge, a bore opening, and a plurality of coil receiving slots intersecting with the central opening, the method comprising the steps of:

arranging the laminations in interfacing relation with each other in a generally loose stack thereof and aligning at least the slots through the loose lamination stack;

positioning the slot liners in the slots of the loose lamination stack and maintaining thereby the general alignment of the slots, respectively;

placing the opposite side turn portions of the coils within the slot liners in the slots of the loose lamination stack and disposing the opposite end turns of the coils generally adjacent the opposite end ones of the laminations in the loose lamination stack, respectively;

disposing the slot wedges at least in part within the slots to prevent the displacement therefrom of the opposite side turn portions of the windings into the bore opening of the laminations in the loose lamination stack and arranging opposite parts of the slot wedges in overlaying relation with confronting parts of the slot liners within the slots of the loose lamination stack, respectively, thereby to form the loose wound core;

mounting a heat responsive expandable sleeve within the bore openings of the laminations in the loose lamination stack;

preheating the loose wound core on the sleeve;

expanding the sleeve into aligning engagement with the bore openings of the laminations in the stack and aligning thereby the loose lamination bore openings through the loose lamination stack in response to the heat transmitted thereto during the preheating step;

rotating conjointly in one direction the loose wound core and the sleeve;

dispensing the liquid adhesive material onto the opposite end turn portions of the coils and flowing a greater amount of the liquid adhesive material from the opposite end turn portions of the coils generally along some of the opposite side turn portions of the coils into the slots of the loose lamination stack in which the some opposite side turn portions are received than is flowed from the opposite end turn portions of the coils generally along the other of the opposite side turn portions of the coils into the slots of the loose lamination stack in which the other opposite side turn portions of the coils are received in response to the conjoint rotation in the one direction of the loose wound core and the sleeve;

seeping liquid adhesive material past the slot liners and slot wedges in the overlaying relation thereof within the slots and therefrom generally by capillary action into wetting relation between the laminations in the loose lamination stack;

containing in the opposite end turn portions of the coils some of the liquid adhesive material dispensed thereto during the conjoint rotation in the one direction of the loose wound core and the arbor;

terminating the conjoint rotation in the one direction of the loose wound core and the sleeve and discontinuing the dispensing of the liquid adhesive material onto the opposite end turn portions of the coils;

reestablishing the conjoint rotation in another direction opposite the one direction of the loose wound core and the sleeve;

reestablishing the dispensing of the liquid adhesive material onto the opposite end turn portions of the coils and flowing a greater amount of the liquid adhesive material from the opposite end turn portions of the coils generally along the other opposite side turn portions of the coils into the slots of the loose lamination stack in which the other opposite side turn portions of the coils are received than is flowed from the opposite end turn portions of the coils generally along the one opposite side turn portions of the coils into the slots of the loose lamination stack in which the one opposite side turn portions of the coils are received in response to the conjoint rotation in the another direction of the loose wound core and the arbor thereby to generally equalize the liquid adhesive material fill of the slots, respectively;

passing liquid adhesive material past the slot liners and the slot wedge in the overlaying relation thereof within the slots and therefrom generally by capillary action into wetting relation between the laminations in the loose lamination stack thereby to supplement the liquid adhesive material associated in wetting relation between the laminations in the loose lamination stack during the conjoint rotation of the loose wound core and the sleeve in the one direction;

supplementing the liquid adhesive material contained in the opposite end turn portions of the coils during the conjoint rotation in the one direction of the loose wound core and the sleeve with the liquid adhesive material dispensed onto the opposite end turn portions of the coils during the conjoint rotation in the another direction of the loose wound core and the sleeve and saturating thereby the opposite end turn portions of the coils;

heating the loose wound core and hardening thereby the liquid adhesive material contained in the loose lamination stack and the coils thereby to effect the bonding of the loose wound core into a unitary mass;

discontinuing the dispensing of the liquid adhesive material onto the opposite end turn portions of the coils and terminating the conjoint rotation in the another direction of the loose wound core and the sleeve; and cooling the loose wound core and the sleeve and removing the sleeve from the loose wound core.

19. A method of fabricating a loose wound core for a dynamoelectric machine, the loose wound core including a plurality of laminations each having a plurality of slot means for receiving winding means of the loose wound core and with the laminations and the winding means being adapted to be bonded together by a hardenable liquid adhesive material, the method comprising the steps of:

arranging the laminations in interfacing relation generally loosely in a stack thereof and aligning the slot means generally axially through the lamination stack;

positioning parts of the winding means in the slot means and arranging other parts of the winding means in generally annular groupings thereof adjacent opposite ends of the lamination stack, respectively;

rotating in one direction the lamination stack and the winding means;

dispensing the liquid adhesive material onto the other parts of the winding means and flowing more of the liquid adhesive material generally along some of the first named parts of the winding means into the slot means of the lamination stack in which the some first named parts of the winding means are received than is flowed generally along some other of the first named parts of the winding means into some other of the slot means of the lamination stack in which the some other first named parts of the winding means are received in response to the rotation in the one direction of the lamination stack and the winding means, respectively;

passing the liquid adhesive material from the slot means of the lamination stack into wetting relation between the laminations of the lamination stack generally by capillary action;

reversing the rotation of the lamination stack and the winding means to effect the rotation thereof in another direction opposite the one direction;

continuing the dispensing of the liquid adhesive material onto the other parts of the winding means and flowing more of the liquid adhesive material generally along the some other first named parts of the winding means into the some other slot means of the lamination stack in which the some other first named parts of the winding means are received than is flowed generally along the some first named parts of the winding means into the some slot means of the lamination stack in which the some first named parts of the winding means are received in response to the rotation in the another direction of the lamination stack and the winding means so as to generally equalize the liquid adhesive material fill of the slot means of the lamination stack;

repeating the passing step when the lamination stack and the winding means are being rotated in the another direction; and curing the liquid adhesive material contained in the loose wound core to effect the hardening of the liquid adhesive material and bonding together thereby into a unitary mass the laminations in the lamination stack and the winding means.

20. The method as set forth in claim 19 wherein the loose wound core further includes a plurality of slot means liners, and comprising the intermediate step of disposing the slot means liners at least in part within the slot means of the laminations in the stack thereof and maintaining thereby the general alignment of the slot means through the lamination stack, the first named parts of the winding means being received at least in part in the slot means liners thereby to electrically insulate the first named parts of the winding means from the lamination stack, respectively.

21. The method as set forth in claim 19 wherein the loose wound core further includes a plurality of slot means wedges, and comprising the further intermediate step of disposing the slot means wedges within the slot means of the lamination stack so as to contain the first named parts of the winding means within the slot means and arranging the slot means wedges and the slot means liners in part in overlaying relation with each other, respectively.

22. The method as set forth in claim 21 wherein the passing step and the repeating step respectively include seeping liquid adhesive material past at least some of the slot means wedges and the slot means liners in the overlaying relation thereof into the wetting relation between the laminations in the lamination stack, respectively, 23. The method as set forth in claim 19 including the intermediate step of establishing a plurality of compression regions extending generally axially across the lamination stack and accumulating more of the liquid adhesive material in the wetting relation thereof between the laminations in the lamination stack externally of the compression regions than internally thereof, respectively.

24. The method as set forth in claim 19 wherein the curing and bonding step includes heating the lamination stack and the winding means and then cooling the lamination, stack and the winding means.

25. The method as set forth in claim 19 comprising the intermediate step of preheating the lamination stack and the winding means.

26. A method of fabricating a loose wound core, the loose wound core including a loose lamination stack having a plurality of interfacing lamination surfaces defined in the loose lamination stack between a pair of opposite ends thereof, a plurality of slot means in the loose lamination stack between the opposite ends thereof for receiving coils of winding means of the loose wound core with the laminations and winding means being adapted to be bonded together by a hardenable liquid adhesive material, the method comprising the steps of:

aligning at least the slot means generally axially through the loose lamination stack, respectively;

positioning opposite parts of the coils in the slot means of the loose lamination stack and arranging other opposite parts of the coils generally adjacent the opposite ends of the loose lamination stack thereby to comprise at least in part the loose wound core, respectively;

rotating the loose wound core alternately in one direction and another direction opposite thereto;

dispensing the liquid adhesive material onto the other opposite parts of the coils with more of the liquid adhesive material flowing therefrom generally along some of the first named opposite parts of the winding coils into some of the slot means of the loose lamination stack in which the some first named opposite parts of the coils are received than along the other of the first named opposite parts of the coils into the other of the slots in the loose wound core in which the other opposite parts of the coils are received in response to the rotation of the loose wound core in the one direction and with more of the liquid adhesive material flowing generally along the other first named opposite parts of the coils into the other slots in the loose lamination stack than along the some first named opposite parts of the coils into the same slot means in the loose lamination stack in response to the rotation of the loose wound core in the another direction and passing some of the liquid adhesive material from at least some of the slot means of the loose lamination stack into wetting relation between at least some of the interfacing lamination surfaces in the loose lamination stack generally by capillary action during the rotation of the loose wound core in the one and another directions; and curing the liquid adhesive material contained in the coils and the loose lamination stack to effect the hardening of the liquid adhesive material and effecting thereby the bonding together into a generally unitary mass of the winding means and the loose lamination stack of the loose wound core.

27. The method as set forth in claim 26 wherein each coil of the winding means has at least one conductor turn with opposite side turn portions and opposite end turn portions, the opposite side turn portions comprising the first named opposite parts of the other first named opposite parts of the coils and the opposite end turn portions comprising the other opposite parts of the coils, respectively.

28. The method as set forth in claim 26 comprising the intermediate step of establishing a plurality of compression regions extending generally axially across the lamination stack between the opposite ends thereof.

29. The method as set forth in claim 28 wherein the dispensing and passing step includes accumulating more of the some liquid adhesive material between the at least some interfacing lamination surfaces in the compressed lamination stack exteriorly of the compression regions than interiorly of the compression regions thereof, respectively.

30. The method as set forth in claim 26 wherein the lamination stack has a bore opening between the opposite ends thereof and wherein the associating and aligning step includes aligning the bore opening generally axially through the lamination stack.

31. The method as set forth in claim 30 comprising the intermediate step of disposing a heat responsive expandable member at least in part within the bore opening in the loose lamination stack.

32. The method as set forth in claim 31 comprising the further intermediate step of preheating the loose wound core and the heat responsive expandable member and expanding thereby the heat responsive expandable member into alinging engagement with the bore opening in the lamination stack of the loose wound core, the heat responsive expandable member being conjointly rotatable with the loose wound core during the rotating step.

33. The method as set forth in claim 26 wherein the loose wound core further includes a plurality of slot means liners and wherein the associating and aligning step includes disposing the slot means liners at least in part within the slot means of the lamination stack, the first named opposite parts of the coils being received at least in part within the slot liners during the positioning and arranging step, respectively.

34. The method as set forth in claim 33 wherein the loose wound core further includes a plurality of slot means wedges and wherein the method further includes the intermediate step of arranging the slot means wedges at least in part within the slot means to retain the coils against displacement therefrom and associating opposite portions of the slot means wedges in overlaying relation with confronting portions of the slot means liners within the slot means of the loose lamination stack, respectively.

35. The method as set forth in claim 34 wherein the dispensing and passing step includes seeping the some liquid adhesive material past at least some of the slot means liners and the slot means wedges in the overlaying relation thereof within the slot means into the at least some slot means and flowing at least a part of the some liquid adhesive material from the at least some slot means into the wetting relation thereof between the at least some interfacing lamination surfaces in the lamination stack, respectively.

36. The method as set forth in claim 33 wherein the slot means liners have a plurality of passages therethrough and wherein the dispensing and passing step includes transmitting the some liquid adhesive material through at least some of the passages in the slot means liners into the slot means and flowing at least a part of the some liquid and adhesive material from the slot means into the wetting relation thereof between the at least some interfacing lamination surfaces of the lamination stack, respectively.

37. The method as set forth in claim 26 wherein the dispensing and passing step includes equalizing at least generally the liquid adhesive material fill of the slot means in response to the rotation of the loose wound core in the one and another directions.

38. The method as set forth in claim 26 wherein the dispensing and passing step includes containing in the other opposite parts of the coils a part of the liquid adhesive material dispensed thereto and at least generally saturating thereby the other opposite parts of the coils.

39. The method as set forth in claim 26 wherein the curing and effecting step includes heating the loose wound core thereby to effect the hardening of the liquid adhesive material contained at least in the coils and the loose lamination stack of the loose wound core, respectively.

40. The method as set forth in claim 39 wherein the curing and effecting step includes cooling the loose wound core subsequent to the heating thereof.

41. The method as set forth in claim 26 comprising the intermediate step of ceasing the dispensing of the liquid adhesive material onto the other opposite parts of the coils prior to the curing and effecting step.

42. A method of fabricating a loose wound core for a dynamoelectric machine, the loose wound core including a loose lamination stack having a plurality of interfacing lamination surfaces defined in the loose lamination stack between a pair of opposite ends thereof, respectively, a plurality of slots in the loose lamination stack between the opposite ends thereof and adapted to receive a plurality of slot liners, a plurality of slot wedges, and winding means of the loose wound core, respectively, with the loose lamination stack and the winding means being adapted to be bonded together by a hardenable liquid adhesive material, and with the winding means having a plurality of coils, each coil having at least one conductor turn with opposite side turn portions and opposite end turn portions, respectively, the method comprising the steps of:

aligning at least the slot means through the loose lamination stack;

disposing the slot means liners in the slot means, respectively;

receiving the opposite side turn portions of the coils within the slot means liners in the slot means and arranging the opposite end turn portions of the coils in opposite generally annular groupings thereof adjacent the opposite ends of the stack, respectively, thereby to comprise at least in part the loose wound core;

rotating in one direction the loose wound core;

dispensing the liquid adhesive material onto the opposite end turn portions of the coils;

flowing a greater amount of the liquid adhesive material dispensed onto the opposite end turn portions of the coils therefrom generally along one of the opposite side turn portions of the coils into the slot means liners within the slot means receiving the one opposite side turn portions of the coils than is flowed generally along the other of the opposite side turn portions of the coils into the slot means liners in the slot means receiving the other opposite side turn portions of the coils in response to the rotation in the one direction of the loose wound core and passing some of the liquid adhesive material from within at least some of the slot means liners exteriorly thereof into at least some of the slot means so as to at least in part effect by capillary action wetting of at least some of the interfacing lamination surfaces in the loose lamination stack by the liquid adhesive material, respectively;

reversing the rotation of the loose wound core to effect the rotation thereof in another direction opposite the one direction;

repeating the dispensing step;

passing a greater amount of the liquid adhesive material dispensed onto the opposite end turn portions of the coils therefrom generally along the other opposite side turn portions of the coils into the slot liners in the slot means receiving the other opposite side turn portions of the coils than is passed along the one opposite side turn portions of the coils into the slot means liners in the slot means receiving the one opposite side turn portions of the coils in response to the rotation in the another direction of the loose wound core thereby to generally equalize the liquid adhesive material fill of the slot means and flowing some of the liquid adhesive material from within at least some of the slot means liners exteriorly thereof into at least some of the slot means so as to further effect the wetting generally by capillary action of at least some of the interfacing lamination surfaces in the loose lamination stack by the at least some liquid adhesive material, respectively; and curing the loose wound core to effect the hardening of the liquid adhesive material contained therein and effecting the bonding thereby of the winding means, the slot means liners and the loose lamination stack into a generally unitary mass.

43. The method as set forth in claim 42 wherein the dispensing step includes containing a part of the liquid adhesive material in the opposite end turn portions of the coils during the rotation in the one direction of the loose wound core.

44. The method as set forth in claim 43 wherein the repeating step includes supplementing the liquid adhesive material part retained in the opposite end turn portions of the coils during the rotation in the one direction of the loose wound core with another part of the liquid adhesive material dispensed onto the opposite end turn portions of the coils during the rotation in the another direction of the loose wound core so that the winding means become generally saturated with the liquid adhesive material, respectively.

45. The method as set forth in claim 42 including the intermediate step of establishing a plurality of compression regions generally axially across the loose lamination stack and accumulating more of the liquid adhesive material in the wetting relation thereof between the at least some interfacing lamination surfaces in the loose lamination stack exteriorly of the compression regions than interiorly thereof, respectively.

46. The method as set forth in claim 42 comprising the intermediate step of heating the loose wound core to at least a preselected temperature at least prior to the dispensing step.

47. The method as set forth in claim 46 wherein the loose wound core further includes a bore defined in the loose lamination stack between the opposite ends thereof, and comprising the further intermediate step of disposing a heat responsive expandable sleeve at least in part within the bore and expanding the sleeve in engagement with the bore to effect the alignment thereof through the loose lamination stack in response to the heat transmitted to the sleeve during the heating step.

48. The method as set forth in claim 42 wherein the curing and bonding step includes heating the loose wound core at least to a preselected temperature and then cooling the loose wound core.

49. A method of operating apparatus for bonding a loose wound core with a hardenable liquid adhesive material into a generally unitary mass and with the loose wound core being adapted for use in a dynamoelectric machine, the apparatus having a plurality of work stations and including at least one rotatable mandrel, means operable generally for progressively indexing the at least one rotatable mandrel between a plurality of preselected indexed positions through the work stations, a plurality of means for effecting rotation of the at least one rotatable mandrel, a plurality of sets of dispensing means for the hardenable liquid adhesive material movable between at-rest and advanced positions, and a plurality of sets of heating devices, and the loose wound core including a loose lamination stack having a plurality of interfacing lamination surfaces defined in the loose lamination stack between a pair of opposite end faces thereof, a circumferential surface on the loose lamination stack between the opposite end faces thereof, a bore extending through the loose lamination stack between the opposite end faces thereof, a plurality of slots extending generally in aligned relation through the loose lamination stack and intersecting with both the bore and the opposite end faces and receiving winding means of the loose wound coil, the winding means having a plurality of coils, each coil having at least one conductor turn with opposite side turn portions of the coils arranged in the slots and opposite end turn portions of the coils arranged in generally annular groupings about the bore adjacent the opposite end faces, a plurality of slot liner means disposed at least in part within the slots for maintaining the generally aligned relation thereof and for at least in part insulating the opposite side turn portions of the coils from the loose lamination stack, and a plurality of slot wedge means in the slots and arranged in part in overlaying relation with the slot liner means for retaining the opposite side turn portions of the coils against displacement from the slots toward the bore, respectively, the method comprising the steps of:

operating the indexing means to effect the indexing of the at least one rotatable mandrel progressively through the preselected indexed positions at the work stations;

mounting the loose wound core onto the at least one rotatable mandrel at a first work station with the bore of the loose lamination stack extending within a preselected angular range with respect to the horizontal and indexing the at least one rotatable mandrel device and the loose wound core thereon from the first work station to a second work station;

preheating the loose wound core on the at least one rotatable mandrel to at least a preselected temperature in response to the energization of one of the heating device sets at the second work station;

indexing the at least one rotatable mandrel and the loose wound core thereon from the second work station into one of the preselected indexed positions at a third work station and moving the one of the dispensing means sets from the at-rest positions toward the advanced positions thereof generally adjacent the opposite end turn portions of the coils of the loose wound core on the at least one rotatable mandrel in the one preselected indexed position at the third work station, respectively;

associating one of the rotation effecting means with the at least one rotatable mandrel at least when the at least one rotatable mandrel is in the one preselected indexed position at the third work station and effecting thereby conjoint rotation of the at least one rotatable mandrel and the loose wound core thereon in one direction at a rotational speed generally between a preselected low value and a preselected high value;

dispensing the liquid adhesive material from the one dispensing means set generally at preselected flow rates onto the opposite end turn portions of the coils so as to at least minimize any dripping of the liquid adhesive material from the opposite end turn portions of the coils when the rotational speed of the at least one rotatable mandrel and the loose wound core thereon in the one direction is generally about the preselected low value and to at least minimize any centrifugal displacement of the liquid adhesive material from the opposite end turn portions of the coils when the rotational speed of the at least one rotatable mandrel and the loose wound core thereon is generally about the preselected high value;

retaining in the opposite end turn portions of the coils a part of the liquid adhesive material dispensed thereto and flowing another part of the liquid adhesive material from the opposite end turn portions of the coils generally along the opposite side turn portions of the coils into the slots of the loose lamination stack within the slot means liners and the slot means wedges in which the opposite side turn portions of the coils are received thereby to at least in part fill the slot liner means and the slot wedge means in the slots in which one of the opposite side turn portions of the coils are received with the liquid adhesive material while at least generally impeding the liquid adhesive material fill of the slot liner means and slot wedge means in the slots in which the other of the opposite side turn portions of the coils are received in response to the conjoint rotation of the at least one rotatable mandrel and the loose wound core thereon in the one direction in the one preselected indexed position at the third work station;

flowing some of the liquid adhesive material past at least some of the slot liner means and slot wedge means and exteriorly thereof into the slots and passing the some liquid adhesive material from the slots generally toward the circumferential surface of the loose lamination stack into wetting relation between the interfacing lamination surfaces in the loose lamination stack generally by capillary action, respectively;

terminating the dispensing of the liquid adhesive material onto the opposite end turn portions of the coils and moving the one dispensing means set retractively from the advanced positions toward the at-rest positions thereof at the third work station, respectively;

indexing the at least one rotatable mandrel and the loose wound core thereon from the one preselected indexed position to another of the preselected positions at the third work station and disassociating the at least one rotatable mandrel from the one rotation effecting means;

associating the at least one rotatable mandrel with another of the rotation effecting means at least when the at least one rotatable mandrel and the loose wound core thereon are in the another preselected indexed position at the third work station and reestablishing thereby the conjoint rotation of the at least one rotatable mandrel and the loose wound core thereon in another direction opposite the one direction at a rotational speed generally between the preselected low value and the preselected high value;

advancing another of the dispensing means sets from the at-rest positions toward the advanced positions thereof generally adjacent the opposite end turn portions of the coils of the loose wound core on the at least one rotatable mandrel in the another preselected indexed position at the third work station;

applying the liquid adhesive material from the another dispensing means set at preselected flow rates onto the opposite end turn portions of the coils so as to at least minimize any dripping of the liquid adhesive material from the opposite end turn portions of the coils when the rotational speed of the at least one rotatable mandrel and the loose wound core thereon in the another direction is generally about the preselected low value and to at least minimize any centrifugal displacement of the liquid adhesive material from the opposite end turn portions of the coils when the rotational speed of the at least one rotatable mandrel and the loose wound core thereon is generally about the preselected high value, respectively;

flowing a part of the liquid adhesive material applied onto the opposite end turn portions of the coils therefrom generally along the opposite side turn portions of the coils into the slots of the lamination stack within the slot liner means and slot wedge means in which the opposite side turn portions of the coils are received and filling at least in part the slot liner means and slot wedge means in the slots in which the other opposite side turn portions of the coils are received with the liquid adhesive material flowed thereinto while at least generally impeding the liquid adhesive material fill of the slot liner means and slot wedge means in the slots in which the one opposite side turn portions of the coils are received in response to the conjoint rotation of the at least one rotatable mandrel and the loose wound core thereon in the another direction thereby to generally equalize the liquid adhesive material fill of the slots in the lamination stack;

repeating the flowing and passing step while the at least one rotatable mandrel and the loose wound core thereon are being conjointly rotated in the another direction;

containing in the opposite end turn portions of the coils a part of the liquid adhesive material applied thereto while the at least one rotatable mandrel and the loose wound core thereon are being conjointly rotated in the another direction so as to at least generally saturate the winding means with the liquid adhesive material;

ceasing the application of the liquid adhesive material onto the opposite end turn portions of the coils and retracting the another dispensing means set from the advanced positions to the at-rest positions thereof at the third work station;

disassociating the at least one rotatable mandrel from the another rotation effecting means and indexing the at least one rotatable mandrel and the loose wound core thereon from the another preselected indexed position at the third work station to a fourth work station;

reheating the loose wound core at least to another preselected temperature so as to effect the hardening of the liquid adhesive material contained in the loose wound core and bonding thereby the the loose wound core into the unitary mass in response to the energization of another of the heating device sets at the fourth work station;

indexing the at least one rotatable mandrel and the bonded loose wound core thereon from the fourth work station through a fifth work station and cooling thereby the bonded loose wound core in the fifth work station; and indexing the at least one rotatable mandrel and the bonded loose wound core thereon from the fifth work station back to the first work station and dismounting the bonded loose wound core from the at least one rotatable mandrel at the first work station.

50. A method of operating apparatus for bonding with a hardenable liquid adhesive material a loose wound core for a dynamoelectric machine, the apparatus comprising a plurality of work stations, at least one rotatable mandrel, drive means operable generally for moving the at least one chucking device progressively between a plurality of preselected indexed positions through the work stations, and a plurality of means operable generally for effecting rotation of the at least one chucking device in one direction and another direction opposite the one direction in different ones of the preselected indexed positions of the chucking device in at least one of the work stations, respectively, a plurality of sets of means operable generally for dispensing the liquid adhesive material and arranged generally at the different ones of the preselected indexed positions of the at least one chucking device in the at least one work station, respectively, and means operable generally for generating heat at another of the work stations, the loose wound core comprising a loose lamination stack having a plurality of interfacing lamination surfaces defined in the loose lamination stack between a pair of opposite end faces thereof with a generally circumferential surface interposed therebetween, a plurality of slot means extending generally in axial relation through the loose lamination stack between the opposite end faces thereof for receiving winding means of the loose wound core, respectively, the winding means including a plurality of coils each having at least one conductor turn with opposite side turn portions of the coils received in the slot means of the loose lamination stack and with opposite end turn portions of the coils arranged generally in annular groupings thereof adjacent the opposite end faces of the loose lamination stack, respectively, the method comprising the steps of:

mounting at still another of the work stations the loose wound core onto the at least one rotatable mandrel with the slot means of the loose lamination stack extending generally in the axial relation thereof through the loose lamination stack and operating the drive means to effect the movement of the at least one rotatable mandrel with the loose wound core therein through the work stations;

successively associating the rotation effecting means with the at least one rotatable mandrel so as to effect the rotation thereof in the one direction and the another direction at least when the at least one rotatable mandrel is in the different ones of the preselected indexed positions thereof at the at least one work station;

successively operating the dispensing means sets to dispense the liquid adhesive material therefrom onto the opposite end turn portions of the coils of the winding means on the loose wound core and flowing the liquid adhesive material from the opposite end turn portions of the coils generally along the opposite side turn portions of the coils into the slot means of the loose lamination stack in which the opposite side turn portions of the coils are received in response to the conjoint rotation of the at least one rotatable mandrel and the loose wound core thereon in the one direction and the another direction when the at least one rotatable mandrel is in the different ones of the preselected indexed positions thereof at the at least one work station, respectively;

passing some of the liquid adhesive material from at least some of the slot means in the loose lamination stack generally by capillary action into wetting relation between at least some of the interfacing lamination surfaces in the loose lamination stack with the some liquid adhesive material penetrating generally in a radial direction from the at least some slot means toward the circumferential surface of the loose lamination stack; and heating the loose wound core upon the movement of the at least one rotatable mandrel through the preselected indexed positions thereof at the another work station in response to the heat generated by the heating means at the another work station and hardening thereby the liquid adhesive material contained in the loose wound core so as to effect the bonding thereof into a generally unitary mass.

51. A method of operating apparatus for bonding a loose wound core with a hardenable liquid adhesive material into a generally unitary mass, the apparatus comprising a plurality of work stations, and at least a pair of sets of means operable generally for dispensing the liquid adhesive material, the loose wound core comprising a lamination stack having a plurality of interfacing lamination surfaces defined in the lamination stack between a pair of opposite end faces thereof, a plurality of slot means extending generally axially through the lamination stack between the opposite end faces thereof for receiving winding means of the loose wound core, respectively, the winding means including a plurality of coils having at least one conductor turn with opposite side turn portions of the coils received in the slot means of the lamination stack and with opposite end turn portions of the coils arranged generally in annular groupings thereof adjacent the opposite end faces of the lamination stack, respectively, the method comprising the steps of:

moving the loose wound core progressively between a plurality of preselected indexed positions through the work stations of the apparatus;

preheating the loose wound core during the movement thereof through one of the work stations of the apparatus;

rotating the loose wound core in one direction in at least one of the preselected indexed positions thereof and in another direction opposite the one direction in at least another of the preselected indexed positions thereof during the movement of the loose wound core through another of the work stations of the apparatus and operating the dispensing means sets at the another work station of the apparatus to dispense the liquid adhesive material onto the opposite end turn portions of the coils of the loose wound core during at least a part of the rotation of the loose wound core in the one and another directions in the at least one and another preselected indexed positions thereof at the another work station of the apparatus, respectively;

flowing the liquid adhesive material from the opposite end turn portions of the coils generally along the opposite side turn portions of the coils into the slot means of the loose wound core in which the opposite side turn portions of the coils are received and passing some of the liquid adhesive material from at least some of the slot means by capillary action into wetting relation between at least some of the interfacing lamination surfaces in the lamination stack in response to the rotation of the loose wound core in the one and another directions in the at least one and another preselected indexed positions thereof at the another work station of the apparatus, respectively; and heating further the loose wound core during the movement thereof through at least another one of the work stations of the apparatus and curing thereby the liquid adhesive material in the loose wound core to effect the hardening of the liquid adhesive material so as to bond the winding means and the laminations of the loose wound core into the generally unitary mass thereof.

52. A method of treating a loose wound core with a hardenable liquid adhesive material adapted for bonding the loose wound core, the loose wound core including a lamination stack having a plurality of interfacing lamination surfaces defined in the lamination stack between a pair of opposite ends thereof and having a plurality of slot means extending between the opposite ends for receiving winding means of the loose wound core, the winding means having a plurality of coils, each coil having at least one conductor turn with opposite side turn portions of the coils received at least in part within the slot means and with opposite end turn portions of the coils arranged in generally annular groupings thereof at least generally adjacent the opposite ends of the lamination stack, respectively, the method comprising the steps of:

rotating the loose wound core for preselected periods of time in one direction and another direction opposite the one direction and dispensing the liquid adhesive material onto the opposite end turn portions of the coils during at least a part of the preselected time period during which the loose wound core is rotated in the one and another directions, respectively;

flowing a greater amount of the liquid adhesive material from the opposite end turn portions of the coils along some of the opposite side turn portions of the coils into the slot means in which some opposite side turn portions of the coils are received than is flowed along some of the other opposite side turn portions of the coils into the slot means in which the some other opposite side turn portions of the coils are received during the rotation of the loose wound core in one of the one and another directions with the greater amount of the liquid adhesive material being flowed along the some other opposite side turn portions of the coils into the slot means in which the some other opposite side turn portions of the coils are received than is flowed along the some opposite side turn portions of the coils into the slot means in which the some opposite side turn portions of the coils are received during the rotation of the loose wound core in the other of the one and another directions and passing some of the liquid adhesive material from at least some of the slot means at least generally by capillary action between at least some of the interfacing lamination surfaces in the lamination stack, respectively; and curing the liquid adhesive material to effect the hardening thereof in the loose wound core and bonding thereby to loose wound core.

53. The method as set forth in claim 52 comprising the preliminary step of heating the loose wound core at least to a preselected temperature.

54. The method as set forth in claim 52 wherein the flowing and passing step includes equalizing at least generally the liquid adhesive material fill of the slot means when the loose wound core is rotated in the one and another directions, respectively.

55. The method as set forth in claim 52 wherein the flowing and passing step includes containing in the opposite end turn portions of the coils a part of the liquid adhesive material dispensed thereto and at least generally saturating thereby the opposite end turn portions of the coils with the liquid adhesive material part contained therein, respectively.

56. The method as set forth in claim 52 comprising the preliminary step of establishing a plurality of compression regions extending generally axially between the opposite ends of the lamination stack of the loose wound core, respectively.

57. The method as set forth in claim 56 wherein the flowing and passing step includes accumulating more of the some liquid adhesive material between the at least some interfacing lamination surfaces in the lamination stack exteriorly of the compression regions than interiorly thereof, respectively.

58. The method as set forth in claim 52 wherein the curing step includes heating the loose wound core at least to a preselected temperature thereby to effect the hardening of the liquid adhesive material in the loose wound core.

59. The method as set forth in claim 52 wherein the loose wound core further includes a plurality of means disposed at least in part within the slot means for at least in part electrically insulating the opposite side turn portions within the slot means from the lamination stack, and a plurality of means disposed at least in part within the slot means and arranged in overlaying relation with confronting parts of the electrically insulating means for retaining the opposite side turn portions of the coils against displacement from the slot means, respectively, and wherein the flowing and passing step includes seeping the some liquid adhesive material between at least some of the electrically insulating means and the retaining means in the overlaying relation thereof into the at least some slot means exteriorly of the electrically insulating means and retaining means therein to effect the wetting relation of the some liquid adhesive material between the at least some interfacing lamination surfaces of the lamination stack, respectively.

60. The method as set forth in claim 52 wherein the loose wound core further includes a plurality of electrical insulating means disposed at least in part within the slot means for extending at least in part about the opposite side turn portions of the coils received in the slot means, and with at least some of the electrical insulating means having a plurality of perforations therethrough, respectively, and wherein the flowing and passing step includes seeping the some liquid adhesive material through at least some of the perforations in the at least some electrical insulating means into the at least some slot means exteriorly of the electrical insulating means therein so as to effect the wetting relation of the some liquid adhesive material between the interfacing lamination surfaces in the lamination stack, respectively.

61. A method of operating apparatus for bonding a loose wound core with a hardenable liquid adhesive material into a generally unitary mass, the apparatus including a plurality of work stations, and at least one set of means operable at at least one of the work stations for dispensing the liquid adhesive material, and the loose wound core including a lamination stack having a plurality of interfacing laminations defined in the lamination stack between a pair of opposite end faces thereof and also having a plurality of slot means extending between the opposite end faces for receiving winding means of the loose wound core, the winding means having a plurality of coils and each coil having at least one conductor turn with opposite side turn portions thereof received at least in part in the slots and with opposite end turn portions thereof disposed generally adjacent the opposite end faces of the lamination stack, the method comprising the steps of:

moving the loose wound core progressively through the work stations;

rotating the loose wound core in one direction and another direction opposite thereto at the at least one work station and operating the at least one dispensing means set to dispense the liquid adhesive material onto the opposite end turn portions of the coils of the loose wound core, respectively;

flowing a greater amount of the liquid adhesive material from the opposite end turn portions along one of the opposite side turn portions of the coils into the slot means receiving them than along the other of the opposite side turn portions of the coils into the slot means receiving them in response to the rotation in the one direction of the loose wound core with the greater amount of the liquid adhesive material being flowed along the other opposite side turn portions into the slot means receiving them than along the one opposite side turn portion into the slot means receiving them in response to the rotation in the another direction of the loose wound core and passing some of the liquid adhesive material from at least some of the slot means into wetting relation between at least some of the interfacing lamination surfaces in the lamination stack upon the rotation of the loose wound core in the one and another directions, respectively; and curing the liquid adhesive material in the loose wound core during the movement thereof through at least another of the work stations thereby to harden the liquid adhesive material so as to effect the bonding of the loose wound core into the generally unitary means.

62. The method as set forth in claim 61 wherein the flowing and passing step includes at least generally equalizing the liquid adhesive material fill of the slot means in response to the liquid adhesive material flowed thereto during the rotation in the one and another direction of the loose wound core.

63. The method as set forth in claim 61 wherein the apparatus further includes means associated with a third one of the work stations for generating heat therein and wherein the method further comprises the intermediate step of operating the heat generating means and heating thereby the loose wound core upon the movement thereof through the third one work station toward the at least one work station.

64. The method as set forth in claim 61 wherein the apparatus further includes means associated with the at least another work station and operable generally for generating heat therein and wherein the curing step includes operating the heat generating means and heating thereby the loose lamination core upon the movement thereof through the at least another work station thereby to effect the hardening of the liquid adhesive material contained in the loose wound core.

65. The method as set forth in claim 61 wherein the curing step includes effecting the rotation of the loose wound core in at least one of the one and another directions during at least a part of the movement of the loose wound core through the at least another work station.

66. The method as set forth in claim 61 comprising the additional step of cooling the loose wound core upon the movement thereof through a third one of the work stations.

67. The method as set forth in claim 61 wherein the loose wound core further includes a plurality of slot liners and a plurality of slot wedges disposed at least in part in the slot means and having confronting parts arranged in overlaying relation and with the opposite side turn portions of the coils being received at least in part within the slot liners and the slot wedges in the slot means, respectively, and wherein the flowing and passing step includes seeping the some liquid adhesive material past at least some of the slot liners and the slot wedges in the overlaying relation thereof to effect the wetting relation of the some liquid adhesive material between the at least some interfacing lamination surfaces in the lamination stack, respectively.

68. The method as set forth in claim 61 wherein the loose wound core further includes a plurality of slot liners and a plurality of slot wedges disposed at least in part within the slot means and with the opposite side turn portions of the coils being received at least in part within the slot liners and the slot wedges in the slots, and a plurality of passages through at least some of the slot liners, respectively, and wherein the flowing and passing step includes seeping the some liquid adhesive material through at least some of the passages in the at least some slot liners to effect the wetting relation of the some liquid adhesive material between the at least some interfacing lamination surfaces in the lamination stack, respectively.

69. The method as set forth in claim 61 wherein the loose wound core further includes a plurality of compression regions extending generally axially across the lamination stack and wherein the flowing and passing step includes accumulating more of the some liquid adhesive material between the at least some interfacing lamination surfaces in the lamination stack exteriorly of the compression regions of the lamination stack than interiorly of the compression regions, respectively.

70. The method as set forth in claim 61 wherein the flowing and passing step includes containing in the opposite end turn portions of the coils a part of the liquid adhesive material dispensed thereto from the at least one dispensing means set and at least generally saturating thereby the opposite end turn portions of the coils, respectively.

* * * * *